US 8,850,529 B2

(12) United States Patent
Urakawa

(10) Patent No.: US 8,850,529 B2
(45) Date of Patent: Sep. 30, 2014

(54) COMMUNICATION APPARATUS, COMMUNICATION APPARATUS SYSTEM, AND METHOD CONTROLLING RELAY APPARATUS

(75) Inventor: Yutaka Urakawa, Nagoya (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 30 days.

(21) Appl. No.: 13/361,704

(22) Filed: Jan. 30, 2012

(65) Prior Publication Data

US 2012/0198521 A1 Aug. 2, 2012

(30) Foreign Application Priority Data

Jan. 31, 2011 (JP) ................................. 2011-018318

(51) Int. Cl.
| | | |
|---|---|---|
| G06F 7/04 | (2006.01) | |
| G06F 15/16 | (2006.01) | |
| G06F 21/62 | (2013.01) | |
| G06F 17/30 | (2006.01) | |

(52) U.S. Cl.
CPC ...... *G06F 21/6209* (2013.01); *G06F 17/30056* (2013.01)
USPC .......................................................... 726/4

(58) Field of Classification Search
CPC .......... G06F 17/30056; G06F 17/3028; G06F 21/6218; G06F 17/30699; G06F 17/30017; G06F 21/62; G06F 2221/2141; G06F 2221/2145; H04L 29/06823; H04L 29/06829; H04L 29/06551
See application file for complete search history.

(56) References Cited

U.S. PATENT DOCUMENTS

| | | | | |
|---|---|---|---|---|
| 5,983,268 | A * | 11/1999 | Freivald et al. | 709/218 |
| 7,945,653 | B2 * | 5/2011 | Zuckerberg et al. | 709/223 |
| 2002/0146096 | A1 * | 10/2002 | Agarwal et al. | 379/88.13 |
| 2002/0169826 | A1 * | 11/2002 | Yano et al. | 709/203 |
| 2003/0065647 | A1 * | 4/2003 | Satomi et al. | 707/1 |
| 2003/0182324 | A1 * | 9/2003 | Satomi et al. | 707/203 |
| 2004/0010693 | A1 * | 1/2004 | Noguchi | 713/176 |
| 2005/0097173 | A1 * | 5/2005 | Johns et al. | 709/206 |
| 2005/0198031 | A1 * | 9/2005 | Pezaris et al. | 707/9 |

(Continued)

FOREIGN PATENT DOCUMENTS

| | | |
|---|---|---|
| JP | 2005-167523 A | 6/2005 |
| JP | 2005-269250 A | 9/2005 |
| JP | 2007-512586 A | 5/2007 |
| WO | 2010/014539 A2 | 2/2010 |

OTHER PUBLICATIONS

Sandhaus et al., "From Usage to Annotation", Oct. 2009, ACM, p. 27-34.*
Reek et al., "An Electronic Class Photo Album", Dec. 2006, ACM, p. 15-18 and 32.*

(Continued)

*Primary Examiner* — Eleni Shiferaw
*Assistant Examiner* — Demaris Brown
(74) *Attorney, Agent, or Firm* — Baker Botts L.L.P.

(57) ABSTRACT

A service cooperation system is provided with a multi-function apparatus and a relay apparatus. The service cooperation system changes a disclosure condition of an album in which an electronic file is categorized and stored, for an electronic file storing service offered by the service provider. Without the need for a terminal apparatus such as a personal computer having a fulfilling web browser function, an image reading apparatus itself can perform uploading process, setting of an album of an upload destination and security setting/changing for an album, while notifying the user, who is authorized to a limited disclosure and to view the album, that the album has been updated.

9 Claims, 13 Drawing Sheets

(56) References Cited

U.S. PATENT DOCUMENTS

| | | | |
|---|---|---|---|
| 2006/0174041 A1* | 8/2006 | Satomi et al. | 710/67 |
| 2008/0091723 A1* | 4/2008 | Zuckerberg et al. | 707/104.1 |
| 2009/0030620 A1* | 1/2009 | Novo et al. | 702/21 |
| 2010/0082574 A1* | 4/2010 | Sutherland et al. | 707/706 |
| 2010/0132023 A1* | 5/2010 | Reese et al. | 726/7 |
| 2011/0276637 A1* | 11/2011 | Thornton et al. | 709/206 |
| 2011/0320508 A1* | 12/2011 | Naito et al. | 707/827 |

OTHER PUBLICATIONS

Vaniea et al., "Out of Sight, Out of Mind: Effects of Displaying Access-Control Information Near the Item It Controls", IEEE, p. 128-136.*

Costantino et al., "Are Photos on Social Networks Really Private?", 2013, IEEE, p. 162-165.*

Japan Patent Office, Office Action for Japanese Patent Application No. 2011-018318 (counterpart Japanese patent application), mailed Jan. 8, 2013.

* cited by examiner

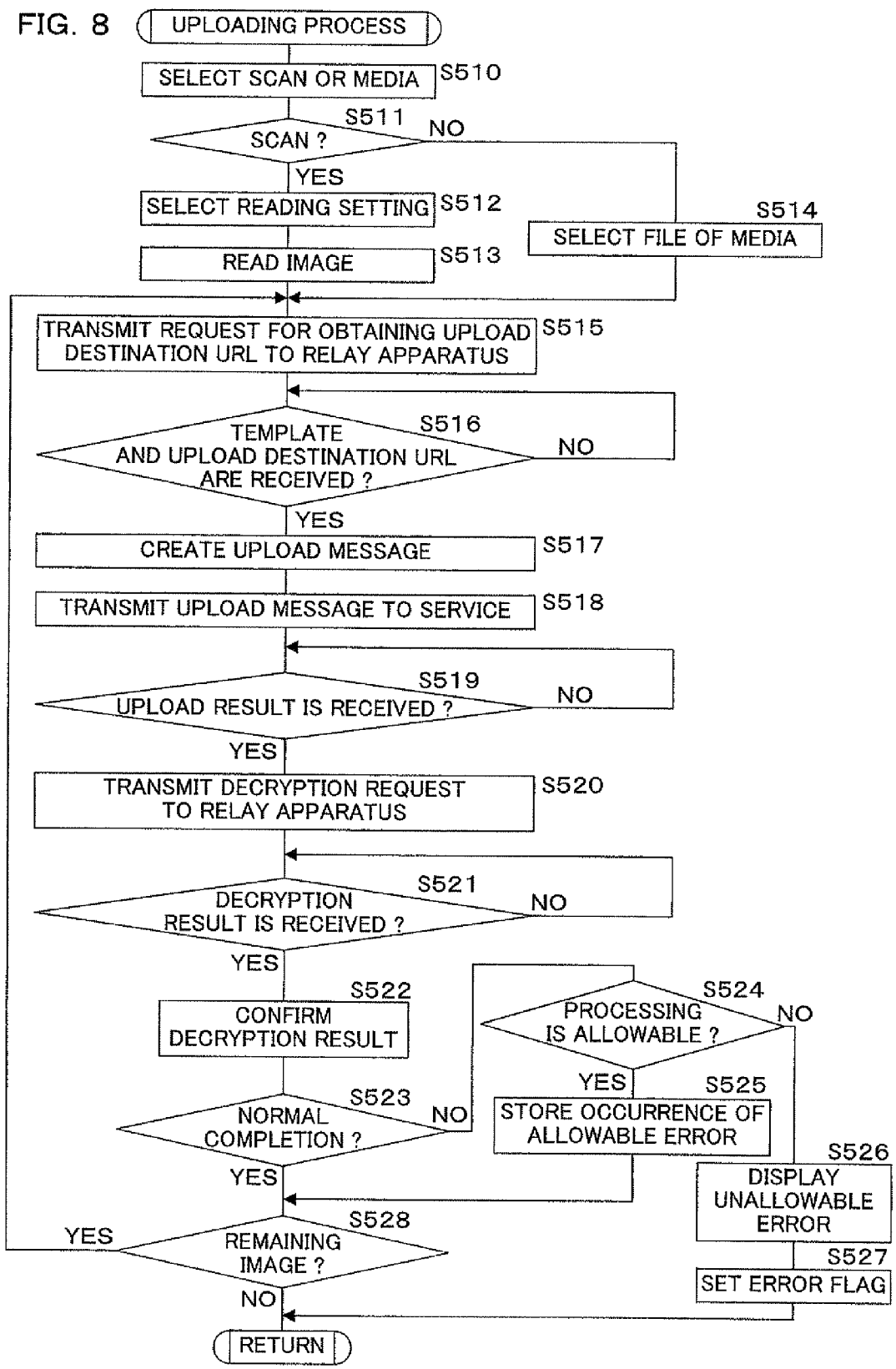

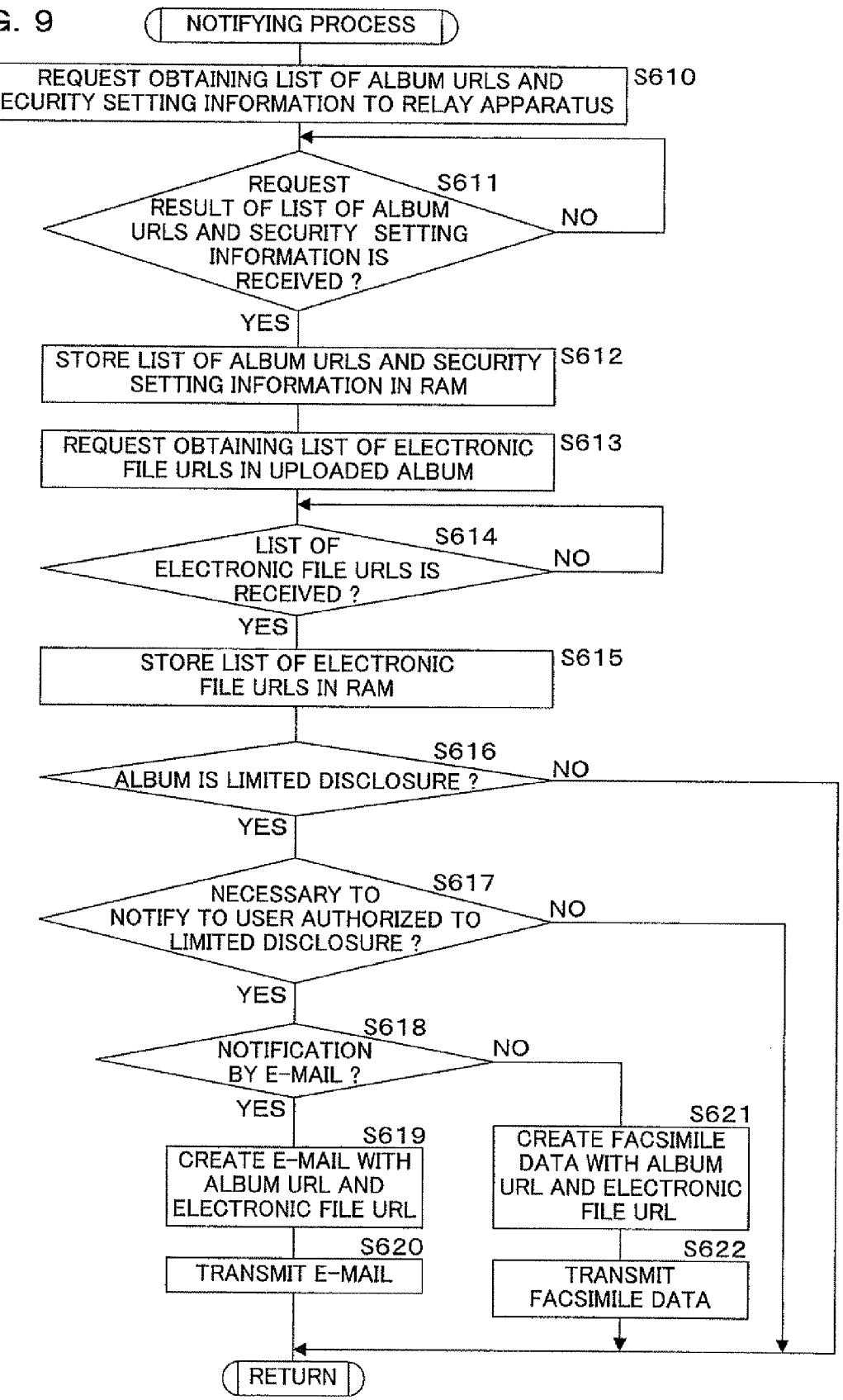

COMMUNICATION APPARATUS, COMMUNICATION APPARATUS SYSTEM, AND METHOD CONTROLLING RELAY APPARATUS

CROSS-REFERENCE TO RELATED APPLICATIONS

This nonprovisional application claims priority under 35 U.S.C. §119(a) on Patent Application No. 2011-018318 filed in Japan on Jan. 31, 2011, the entire contents of which are hereby incorporated by reference.

BACKGROUND

The present invention relates to a communication apparatus, a communication apparatus system and a method controlling a relay apparatus.

Conventionally, an image reading apparatus that uploads an electronic file of a read image to a server, a printing device that prints out an electronic file downloaded from a server and the like have been well known. There has been proposed a related-art image reading apparatus for uploading an electronic file of a read image to a server. When a manufacturer of the image reading apparatus or printing apparatus provides such a service, it is required for the manufacturer to prepare on its own a server dedicated to store the electronic file to be uploaded.

In recent years, an electronic file storing service has been widely used by which an electronic file can be stored in a database on a network prepared by a service provider. An example of such service includes Picasa (registered trademark) Web album and flickr (registered trademark). The user can utilize a terminal apparatus provided with a Web browser to upload a desired electronic file to the electronic file storing service or to download a desired electronic file from the electronic file storing service.

In such circumstances, a service is contemplated by which the electronic file of the image read by the image reading apparatus described above is uploaded to the electronic file storing service offered by the service provider instead of uploading the electronic file to a dedicated server.

SUMMARY

When the service described above is provided by a manufacturer of the image reading apparatus, the user uploads the electronic file of the image read by the image reading apparatus to the electronic file storing service offered by the service provider. The electronic file storing service offered by the service provider, an album can be set for categorizing and storing electronic files. The album can limit, at the time of setting or when an alteration is made later, the authorization to view the electronic files stored in the album. A security setting such as "open disclosure" allowing anyone to view the files, "limited disclosure" allowing a limited number of users to view the files or "nondisclosure" may be employed. In the "limited disclosure," users that share a certain electronic file are set. Such security setting can commonly be performed by a terminal apparatus such as a personal computer provided with a Web browser.

It would be convenient if the electronic file read by the image reading apparatus is uploaded to the electronic file storing service and shared among the users authorized to the limited disclosure. Some image reading apparatus, however, are not provided with sufficient Web browser functions, causing a problem in that sharing of the uploaded electronic file can be a troublesome work. For example, the procedure as described below may be required. First, the read electronic file is transferred to a terminal apparatus, such as a personal computer, on which a Web browser function is mounted. In the terminal apparatus such as a personal computer, setting for an album or setting/changing for security is performed as needed, and then an electronic file is uploaded. It is also necessary to notify each of the users authorized to the limited disclosure, individually, that the electronic file is uploaded and the contents of album are updated.

In view of the circumstances described above, the present invention has an object of providing a communication apparatus, a communication apparatus system and a method controlling a relay device, in which an image reading apparatus itself can perform an uploading process when an electronic file read by the image reading apparatus is uploaded to an electronic file storing service to be available for limited people, without the need for a terminal apparatus such as a personal computer having a fulfilling Web browser function, and can also notify the users authorized to the limited disclosure of the album or the like that the album has been updated.

To solve the above problems, the communication apparatus is a communication apparatus in a communication apparatus system provided with a network including a service providing apparatus of an electronic file storing service and a communication apparatus connected to the network. The communication apparatus system is a communication apparatus system provided with a network including a service providing apparatus of an electronic file storing service and a communication apparatus connected to the network. The communication apparatus system is a communication apparatus system provided with a relay apparatus connected to a network including a service providing apparatus for the electronic file storing service and a communication apparatus connected to the network. The method of controlling the relay apparatus is a method to perform control on the relay apparatus described later.

The communication apparatus is configured to include a storage unit, a security setting unit, an upload processing unit and a notification processing unit. The storage unit registers account information for the user of the electronic file storing service and contact information of the user. The security setting unit requests the electronic file storing service to change a disclosure condition of an album in which the electronic file is categorized and stored. The upload processing unit uploads the electronic file to the electronic file storing service. The notification processing unit notifies, when the electronic file is uploaded, a user who is authorized to a disclosure by the disclosure condition of an album to which the electronic file is uploaded, among the users registered in the storage unit, of a download URL of the album to which the electronic file is uploaded and a download URL of the uploaded electronic file based on the contact information registered in the storage unit.

The relay apparatus is configured including an upload destination program storing unit and a security setting requesting unit. In the upload destination program storing unit, an upload destination program for requesting the service providing apparatus to change a disclosure condition of an album using a disclosure API included in the electronic file storing service. When a request for changing the disclosure condition of the album is received from the communication apparatus, the security setting requesting unit requests the electronic file storing service to change the disclosure condition of the album by executing the upload destination program.

Even if the communication apparatus not provided with a sufficient web browser function is employed, a request for changing a disclosure condition of an album storing an electronic file can be made to the electronic file storing service. Moreover, when the electronic file is uploaded, each user authorized to the limited disclosure by the disclosure condition of the uploaded album can individually be notified that the contents in the album have been uploaded.

The above and further objects and features of the invention will more fully be apparent from the following detailed description with accompanying drawings.

BRIEF DESCRIPTION OF THE SEVERAL VIEWS OF THE DRAWINGS

FIG. 8 is a flowchart illustrating an operation (uploading process) of the multi-function apparatus 100;

FIG. 9 is a flowchart illustrating an operation (notifying process) of the multi-function apparatus 100;

DETAILED DESCRIPTION OF THE EXEMPLARY EMBODIMENTS

Embodiments of the present invention will be described below with reference to the drawings. Note that the drawings to be referred to are used to explain technical characteristics that may be employed by the present invention. The configuration of the apparatuses disclosed, flowcharts of various types of processing and the like are mere illustrative examples, and not to limit the present invention thereto.

<Outline of Service Cooperation System 10>

Figure 1:
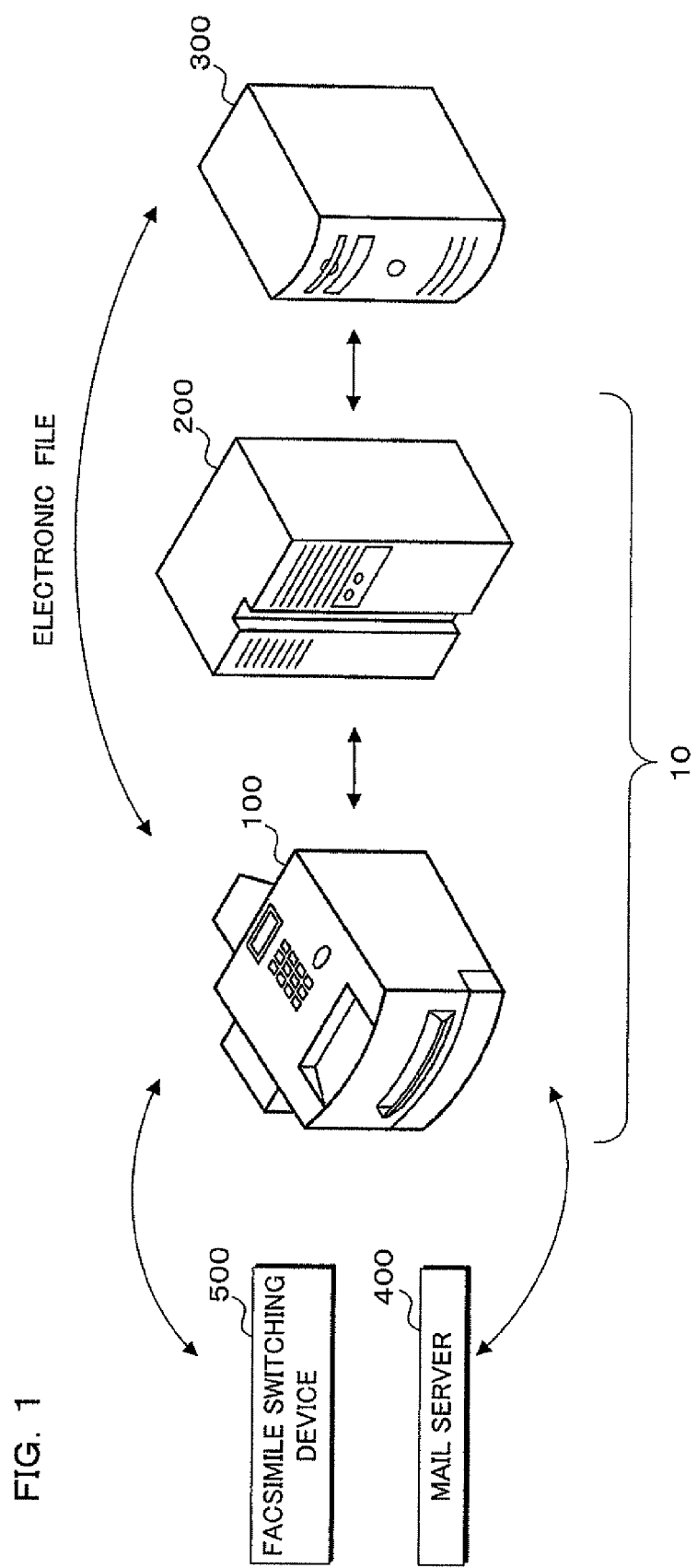
FIG. 1 shows an outline of a service cooperation system 10 according to an embodiment.

Referring to FIG. 1, the outline of the service cooperation system 10 which is the embodiment of the present invention will be described. The service cooperation system 10 includes a multi-function apparatus 100 and a relay apparatus 200. The service cooperation system 10 can upload an electronic file to an electronic file storing service offered by a service provider, or download an electronic file from the electronic file storing service.

The electronic file storing service is provided by a service providing device 300 installed by each service provider on the Internet. More specifically, the service providing apparatus 300 is a well-known Web server. The service providing device 300 performs communication between another terminal connected to the Internet and HTTP or HTTPS to offer a predetermined service to another terminal.

An electronic mail (e-mail) service is offered by a mail server 400 installed by an e-mail service provider. More specifically, the mail server 400 manages and operates the e-mail service.

A facsimile service is provided by a facsimile switching device 500 connected to a public line. Moreover, the facsimile switching device 500 is to connect public lines with each other and configure a line network.

The multi-function apparatus 100 is, more specifically, a small digital complex machine. The multi-function apparatus 100 is provided with functions of printing, scanning, facsimiling and copying, a telephone directory function, as well as writing and reading functions to/from an external storage medium.

The user of multi-function apparatus 100 can upload the electronic file of an image read by the scanning function of multi-function apparatus 100 to the electronic file storing service. Moreover, the user of the multi-function apparatus 100 can print out the electronic file downloaded from the electronic file storing service by the printing function of the multi-function apparatus 100.

The multi-function apparatus 100 can upload and download an electronic file in cooperation with the relay apparatus 200. The multi-function apparatus 100 obtains, from the electronic file storing service via the relay apparatus 200, an upload destination URL at which the electronic file is uploaded to the electronic file storing service, an electronic file URL for the electronic file to be downloaded from the electronic file storing service and the like. However, binary data for an electronic file with a large amount of data is directly transmitted to/from the electronic file storing service without going through the relay apparatus 200. The service cooperation system 10 thus reduces the amount of data to go through the relay apparatus 200. This can further reduce a load on occurring to the relay apparatus 200.

In addition, the multi-function apparatus 100 can perform security setting for an album of the upload destination before the electronic file is uploaded to the electronic file storing service. Here, the album corresponds to a storage region of a file provided in the electronic file storing service. The electronic file is categorized and stored in album to be managed by attribute. Moreover, the e-mail service or facsimile service is used to notify the user who shares an album that the corresponding electronic file has been uploaded.

The relay apparatus 200 may be an apparatus with a well-known server function. The relay apparatus 200 may be prepared by the manufacturer of multi-function apparatus 100 on its own. Alternatively, it is also possible to use a well-known rental server or a virtual machine in which plural physical devices represented by Amazon EC2 (registered trademark) may cooperate together to serve as one server. In such a case, the operational cost for the relay apparatus 200 varies depending on the amount of data transmitted through the relay apparatus 200 or the load on the processing performed by the relay apparatus 200. As described above, the data amount transmitted through the relay apparatus 200 or the load on the relay apparatus 200 may be reduced in order to lower the operational cost for the relay apparatus 200 when using the rental server or virtual machine. Moreover, if the manufacturer prepares the relay apparatus 200 on its own, which does not require high performance, investment in equipment can be suppressed.

<Hardware Configuration of Service Cooperation System 10>

Figure 2:
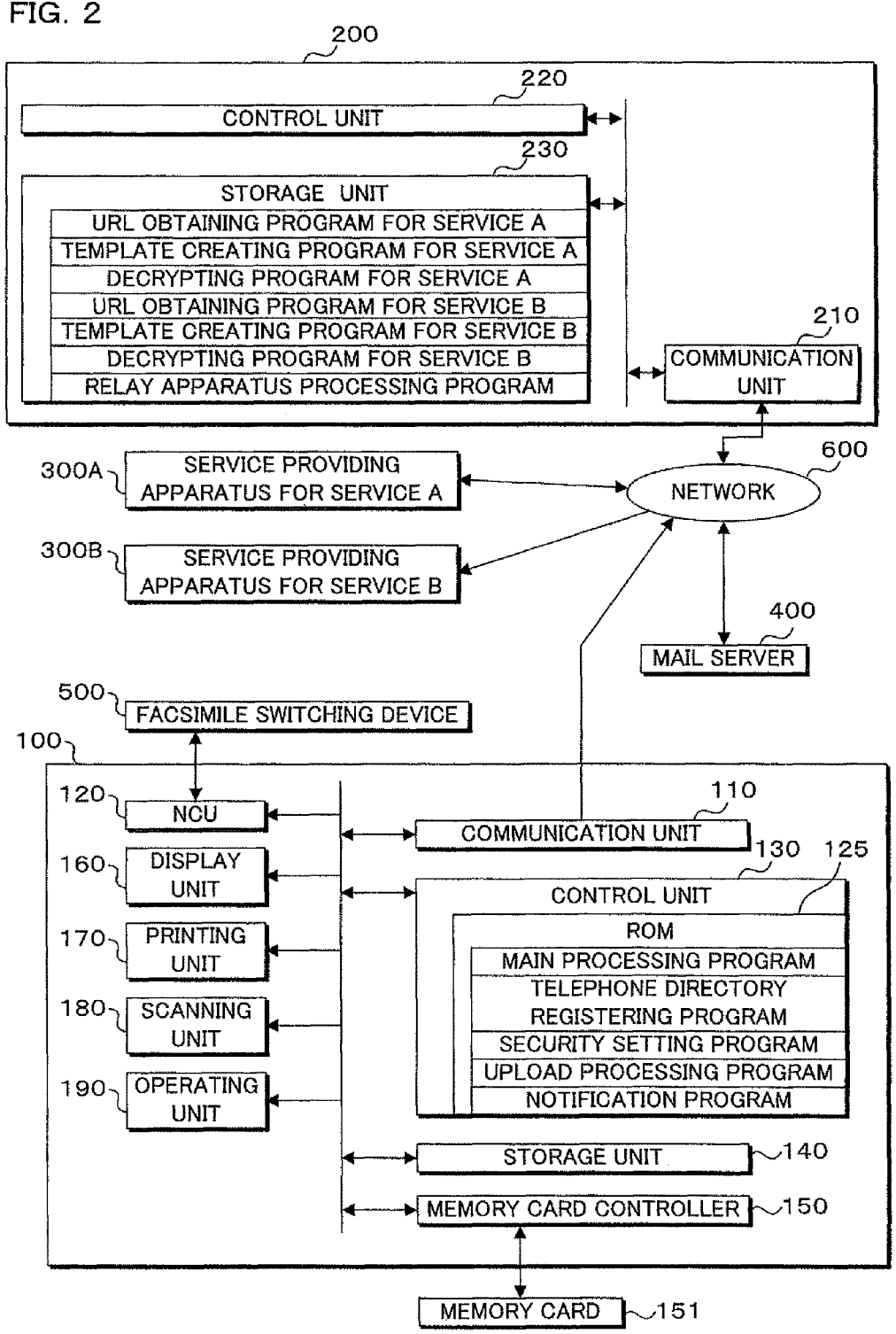
FIG. 2 shows a configuration of hardware included in the service cooperation system 10.

Referring to FIG. 2, the hardware configuration of service cooperation system 10 is described. It is assumed in the description below for the purpose of explanation that the service cooperation system 10 makes two electronic file storing services, a service A and a service B, cooperate with each other. In the description below, the service providing apparatus 300 for service A will be referred to as a service providing apparatus 300A. The service providing apparatus 300 for service B will be referred to as a service providing apparatus 300B. When there is no need to distinguish one from the other, it will simply be described as service providing apparatus 300. The multi-function apparatus 100, relay apparatus 200, service providing apparatus 300A and service providing apparatus 300B are connected with one another through a network 600. For the network 600, the Internet can be employed for example. The multi-function apparatus 100, relay apparatus 200 and service providing apparatus 300 perform transmission of data to/from one another in accordance with HTTP/1.1.

First, the hardware configuration of multi-function apparatus 100 is described. The multi-function apparatus 100 includes a communication unit 110, a NCU (Network Control Unit) 120, a control unit 130, a storage unit 140, a memory card controller 150, a display unit 160, a printing unit 170, a scanning unit 180 and an operating unit 190.

The communication unit 110 is a device for communicating with another apparatus connected to the network 600. For the communication unit 110, a well-known network card may be employed.

The NCU 120 is a device for communicating with the facsimile switching device 500 through the public line. The NCU 120 is provided with a modem, and performs demodulation of a communication signal inputted from the public line or modulation of a communication signal for transmitting image data to the outside.

The control unit 130 is provided with a CPU (not shown) as well as a ROM 125 and a RAM connected to the CPU. The CPU controls the operation of multi-function apparatus 100 in accordance with the program stored in the ROM 125. The program stored in the ROM 125 includes a main processing program, a telephone directory registering program, a security setting program, an upload processing program and a notification program. The RAM is a storage device which temporarily stores various types of data therein. The ROM 125 may be a memory device, or alternatively, be a non-volatile storage device such as a hard disk drive.

Figure 4:
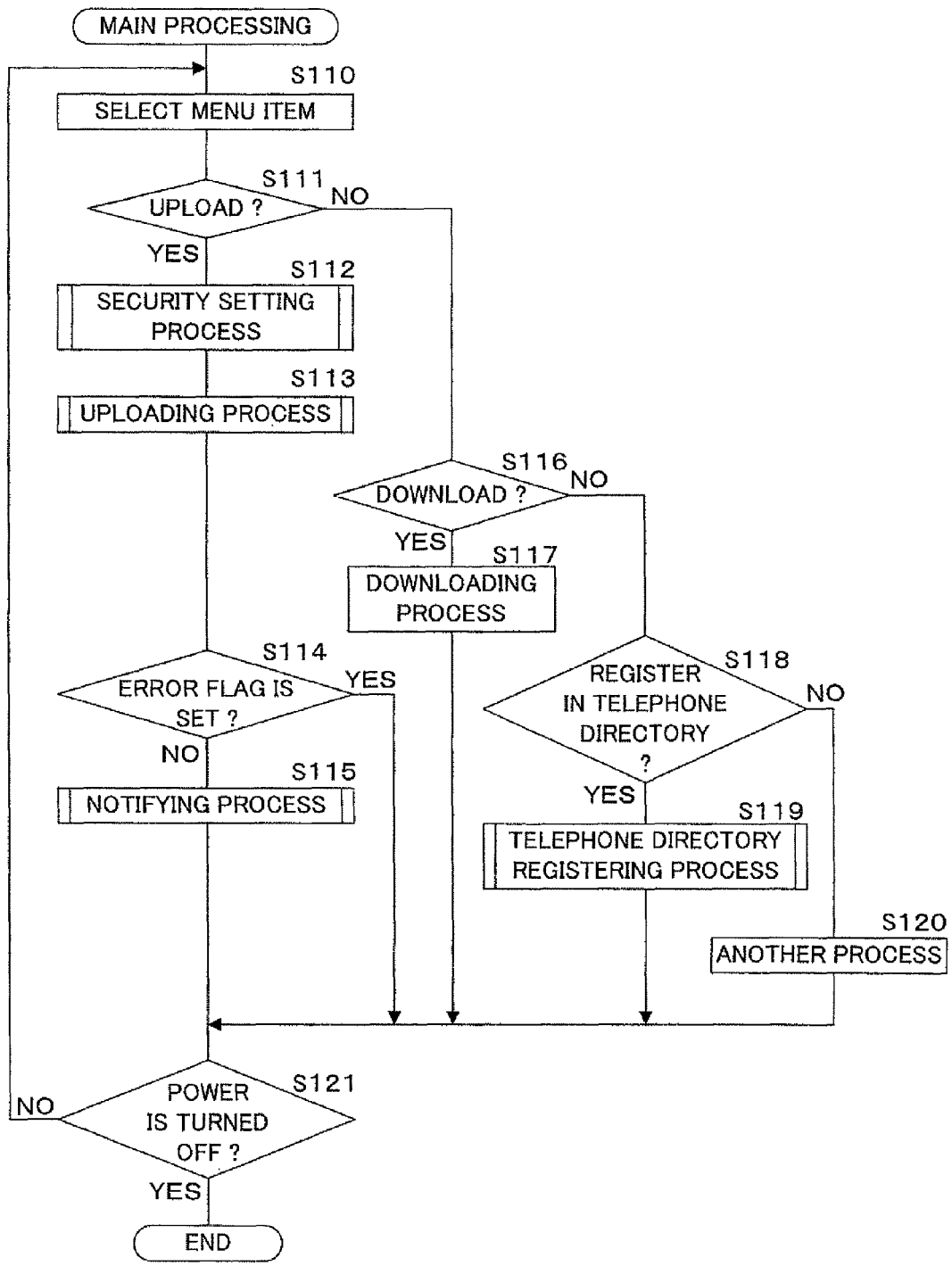
FIG. 4 is a flowchart illustrating an operation (main processing) of a multi-function apparatus 100.

The main processing program is a program for processing performed inside the multi-function apparatus 100 and for communication with the relay apparatus 200 and service providing apparatus 300, in cooperation with a plurality of programs stored in the ROM 125. The telephone directory registering program, security setting program, upload processing program and notification program, which will be described later, are executed as needed. The operation flow will be described later with reference to the flowchart of FIG. 4 for the main processing.

The telephone directory program is for receiving accounts of the name of a registrant, a telephone number, an e-mail address, a facsimile number and a service, and for storing them in the telephone directory information stored in the storage unit 140 described later as registrant information. The operation flow will be described later with reference to the flowchart of the telephone directory registering process of FIG. 5.

The security setting program is for performing security setting such as the setting for the disclosure condition of an album newly created in the electronic file storing service selected by the user and the setting in selecting an existing album to change the disclosure condition. The operation flow will be described with reference to the flowchart of security setting process in FIG. 6 and FIG. 7.

The upload processing program is for uploading an electronic file to the electronic file storing service by the user. The operation flow will be described later with reference to the flowchart of FIG. 8 for the uploading process.

The notification program is for notifying, when the album to which an electronic file is to be uploaded is set in a condition that only a specified user has an access thereto, i.e., a condition of a so-called limited disclosure, the user authorized to view the file that a new electronic file has been uploaded and the album has been updated. The operation flow will be described later with reference to FIG. 9 for the notification process.

The storage unit 140 is a non-volatile storage device such as a NAND flash memory. The storage unit 140 stores information for identifying the user of multi-function apparatus 100 and various setting information. Moreover, the telephone directory information is stored indicating registrant information and the like registered by the user of multi-function apparatus 100.

The memory card controller 150 controls the storage by the memory card 151 attached to the multi-function apparatus 100. More specifically, according to the instructions of control unit 130, the memory controller 150 writes data to the memory card 151, deletes data stored in the memory card 151, or reads data stored in the memory card 151. In the memory card 151, an electronic file of a predetermined type is stored.

The display unit 160 is a display device provided with a display such as a well-known LCD. The display unit 160 displays predetermined information such as a menu item selecting screen, which will be described later, in accordance with the instructions from the control unit 130.

The printing unit 170 is a device for printing an image in accordance with the instructions of the control unit 130.

The scanning unit 180 is a device for reading an image recorded on a sheet of paper set by the user, in accordance with the instructions of the control unit 130.

The operation unit 190 is a device provided with a plurality of operation buttons operated by the user for transmitting a signal to the control unit 130 in response to the pressing operation by the user. The user can input desired instructions by operating the operation unit 190.

Next, the hardware configuration of the relay apparatus 200 is described. Though, in the description of the present embodiment, the relay apparatus 200 is described as a physically-existing server, it may alternatively be a virtual machine, as described above, such as EC2 in which a plurality of physical devices cooperate together to function as one server.

The relay apparatus 200 includes a communication unit 210, a control unit 220 and a storage unit 230.

The communication unit 210 is a device for performing communication with another apparatus connected to the network 600. For the communication unit 210, a well-known network card can be employed.

The control unit 220 includes a CPU (not shown) as well as ROM and RAM connected to the CPU. The CPU controls the operation of relay apparatus 200 in accordance with the program stored in the ROM and storage unit 230. The RAM is a storage device that temporarily stores various types of data therein.

The storage unit 230 is a non-volatile storage device such as a hard disk drive. The storage unit 230 stores a plurality of software modules including a URL obtaining program for service A, a template creating program for service A, a decrypting program for service A, a URL obtaining program for service B, a template creating program for service B, and a decrypting program for service B. Moreover, the storage unit 230 stores therein a relay apparatus processing program for relaying communication with the multi-function apparatus 100 and with the service providing apparatus 300 in cooperation with the plurality of modules described above.

Each of many electronic file storing services discloses its own Application Program Interface (API). Other business providers can utilize such API to offer new services in cooperation with the electronic file storing service to the users. The URL obtaining program for service A is a program for using API disclosed by the service A to obtain the URL to which a file is to be uploaded (hereinafter also referred to as "upload destination URL") from the service providing apparatus 300A. Furthermore, the template creating program for service A is a program for creating a template of an upload message used when uploading an electronic file to the service A. Moreover, the decrypting program for service A is a program for decrypting a response message from the service providing apparatus 300A.

The URL obtaining program for service B is a program for using API disclosed by the service B to obtain an upload destination URL from the service providing apparatus 300B. Moreover, the template creating program for service B is a program for creating a template of an upload message used when uploading the electronic file to the service B. Furthermore, the decrypting program for service B is for decrypting a response message from the service providing apparatus 300B.

The relay apparatus processing program intervenes between the relay apparatus 200 and the service providing apparatus 300 for required processing in accordance with the main processing program executed by the control unit 130. The operation flow will be described later with reference to the flowchart of FIGS. 10A and 10B for the relay apparatus processing.

The user of multi-function apparatus 100 can designate a desired service among a plurality of electronic file storing services. The user of the multi-function apparatus 100 can then upload a desired electronic file for the designated service. Moreover, the user of the multi-function apparatus 100 can select whether to upload the electronic file of an image read by the scanning unit 180 or to upload the existing electronic file stored in the memory card 151. Furthermore, security setting for the electronic file uploaded to the electronic file storing service is changed to set any one of "nondisclosure," "open disclosure" and "limited disclosure" as a disclosure condition. When the "limited disclosure" is set, in which a file is disclosed to specific users, the users can be set who share an album storing the uploaded electronic file. Moreover, the users who have authorized access to the file can be notified that the file has been uploaded to the electronic file storing service through e-mail or facsimile.

<Operation of Service Cooperation System 10>

Figure 3:
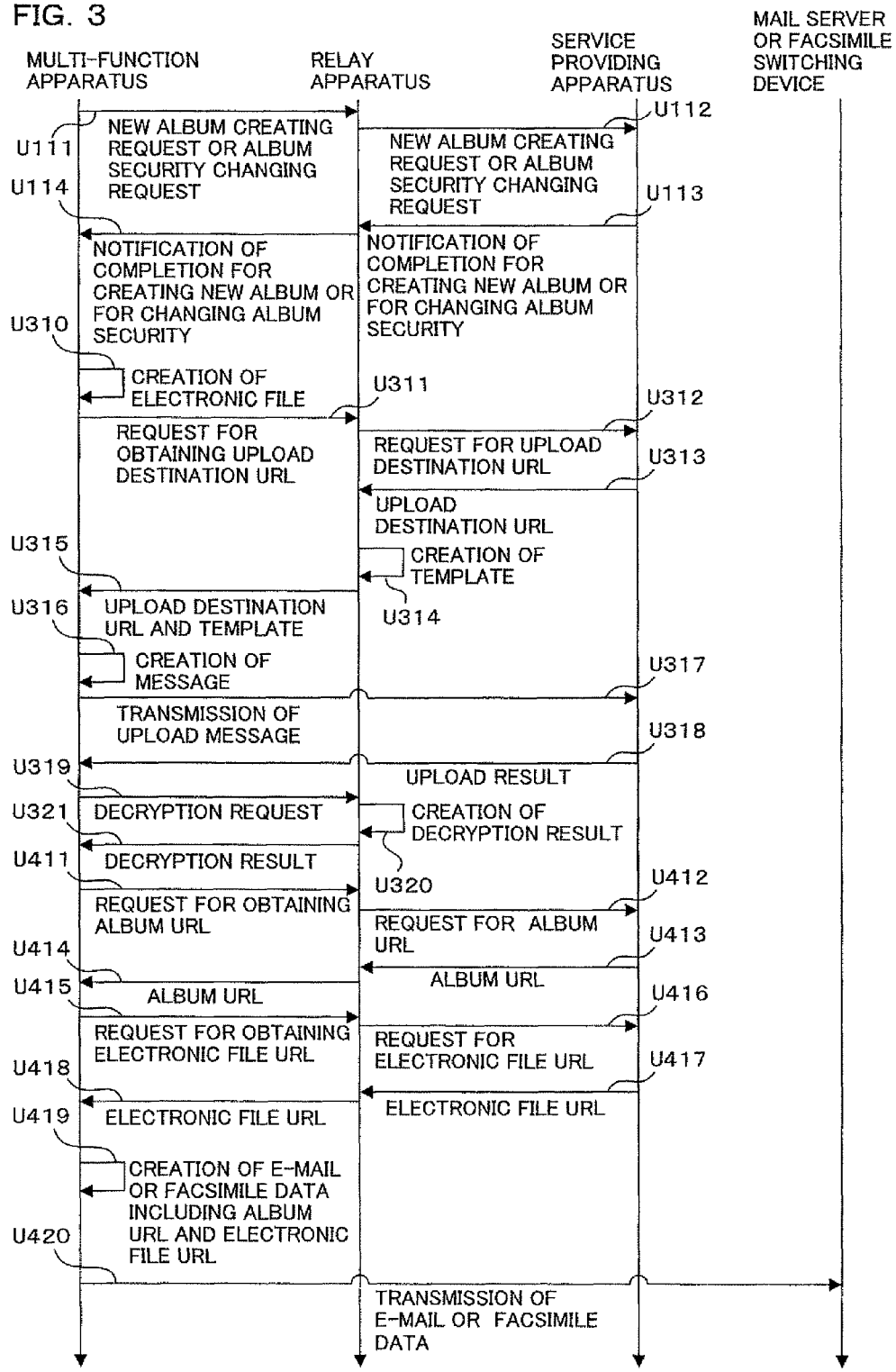
FIG. 3 shows a sequence diagram illustrating an example of the operation of the service cooperation system 10.

Next, referring to FIG. 3, an example of the operation of service cooperation system 10 will be described. FIG. 3 shows a sequence diagram illustrating an example of the operation of service cooperation system 10. In this example, the flow will be described in the case where the user of multi-function apparatus 100 selects to upload the electronic file of the image read by the scanning unit 180. It is understood that the electronic file stored in the memory card 151 may also be uploaded. Note that the electronic file storing service will be simply referred to as a "service" in the description below.

First, when the user operates the operation unit 190 of the multi-function apparatus 100 and selects a service for uploading an electronic file, the multi-function apparatus 100 performs setting for the security of an album. When an album is newly created, a request for newly creating an album (hereinafter also referred to as "new album creating request") is transmitted to the relay apparatus 200 (U111). When the security setting for the existing album is changed, the request for changing security for an album (hereinafter also referred to as "album security changing request") is transmitted to the relay apparatus 200 (U111).

The new album creating request and the album security changing request include service identifying information for identifying a service selected by the user, user identifying information for identifying the user, an album name set by the user and security setting which is a disclosure condition for the album.

The relay apparatus 200 that receives the new album creating request or the album security changing request transmits the new album creating request or album security changing request to the service providing apparatus 300 for the service selected by the user (U112). The relay apparatus 200 identifies the service and user based on the service identifying information and user identifying information included in the new album creating request or album security changing request received from the multi-function apparatus 100. The relay apparatus 200 then creates the new album creating request or album security changing request corresponding to the identified service and user, and transmits it to the service providing apparatus 300. Here, the relay apparatus 200 creates the new album creating request or album security changing request in accordance with a program corresponding to the service designated by the user.

More specifically, if the service A is designated by the user, the relay apparatus 200 creates the new album creating request or album security changing request corresponding to the service A in accordance with the URL obtaining program for service A stored in the storage unit 230, and transmits it to the service providing apparatus 300A. Note that the new album creating request or album security changing request created here corresponds to a HTTP message using API disclosed by the service A. API for creating a new album or changing security for an existing album is different for each service. Thus, the relay apparatus 200 is provided with a program for creating the new album creating request or album security changing request in accordance with each service. More specifically, the relay apparatus 200 includes the URL obtaining program for service A for creating the new album creating request or album security changing request for service A, and the URL obtaining program for service B for creating the new album creating request or album security changing request. The relay apparatus 200 uses these programs and creates the new album creating request or album security changing request corresponding to each service.

The information included in the new album creating request or album security changing request created here may differ depending on each service. When the information for identifying the storing position of the electronic file for the service is required, such as album ID in addition to the album name, to newly create the album on the service side, an album ID corresponding to the album name identified by the user is included in the new album creating request or album security changing request. Moreover, if information for identifying the storing position of the electronic file of the service, such as a folder name, is required in order to identify the new album creating request or album security changing request on the service side, the folder name corresponding to the album name identified by the user is included in the new album creating request or album security changing request. Attachment information such as album ID, folder name and the like corresponding to the album name inputted by the user is stored in the storage unit 230 in advance. The relay apparatus 200 utilizes the required attachment information to create the new album creating request or album security changing request in accordance with each service.

The service providing apparatus 300 that has received the new album creating request or album security changing request transmits a notification of completion to the relay apparatus 200 when the new album has been created or the security has been changed for the existing album (U113). The multi-function apparatus 100 then receives, through the relay apparatus 200, the notification of completion for creating a new album or for changing the album security (U114).

After the new album is created or the security setting is changed, a process of uploading the electronic file is performed. The multi-function apparatus 100 controls the scanning unit 180 by the control unit 130, reads an image and creates an electronic file from the read image data (U310). The multi-function apparatus 100 then transmits a request for obtaining an upload destination URL to the relay apparatus 200 (U311). The request for obtaining an upload destination URL includes service identifying information for identifying the service selected by the user and user identifying information for identifying the user.

The relay apparatus 200 that receives the request for obtaining upload destination URL transmits the request for upload destination URL to the service providing apparatus 300 for the service selected by the user (U312). The relay apparatus 200 identifies the service and user based on the service identifying information and user identifying information included in the request for obtaining upload destination URL received by the multi-function apparatus 100. The relay apparatus 200 then creates the request for upload destination URL corresponding to the service and user and transmits them to the service providing apparatus 300. Here, the relay apparatus 200 creates the request for upload destination URL in accordance with the program corresponding to the service designated by the user.

More specifically, when the service A is designated by the user, the relay apparatus 200 creates the request for upload destination URL corresponding to the service A in accordance with the URL obtaining program for service A stored in the storage unit 230, and transmits the created request to the service providing apparatus 300A. Note that the request for upload destination URL created here corresponds to a HTTP message using API disclosed by the service A. API for obtaining URL of upload destination is different for each service. Thus, the relay apparatus 200 is provided with a program for creating the request for upload destination URL corresponding to each service. More specifically, the relay apparatus 200 includes a URL obtaining program for service A for creating the request for upload destination URL for service A and a URL obtaining program for service B for creating the request for upload destination URL for service B. The relay apparatus 200 uses the programs to create the request for upload destination URL corresponding to each service.

The information included in the request for upload destination URL created here may be different for each service. If information for identifying storing position of an electronic file for the service, such as album ID, is required in order to identify the upload destination URL on the service side, the album ID for an album used by the user is included in the request for upload destination URL. Moreover, if the information for identifying the storage position of the electronic file of the service, such as a folder name, is required to identify the upload destination URL on the service side, the folder name used by the user is included in the request for upload destination URL. The attachment information such as the album ID, a folder name and the like used by the user are stored in advance in the storage unit 230. The relay apparatus 200 uses necessary attachment information to create the request for upload destination URL in accordance with each service.

The service providing apparatus 300 that received the request for upload destination URL transmits the URL corresponding to the request for upload destination URL to the relay apparatus 200 as the upload destination URL (U313).

The relay apparatus 200 that receives the upload destination URL creates a template of an upload message to be transmitted from the multi-function apparatus 100 to the service providing apparatus 300 (U314). The upload message is a message for requesting uploading to the electronic file storing service.

In order to create a template appropriate for various services, the relay apparatus 200 includes a program for creating a template for each service. More specifically, the relay apparatus 200 includes a template creating program for service A and a template creating program for service B.

The relay apparatus 200 which obtains the upload destination URL at U313 and creates a template for upload message at U314 transmits the upload destination URL received from the service providing apparatus 300 and the created template to the multi-function apparatus 100 (U315).

The multi-function apparatus 100 creates an upload message based on the template obtained from the relay apparatus 200 (U316). The upload message to be created includes the upload destination URL obtained from the relay apparatus 200 and binary data of the electronic file for the read image. The multi-function apparatus 100 can create an upload message corresponding to each service only by storing the binary data of electronic file, the upload destination address and the data size for the electronic file at a predetermined position in the template received from the relay apparatus 200.

The multi-function apparatus 100 that creates the upload message transmits an upload message to the service providing apparatus 300 for the service selected by the user (U317). Accordingly, the user of multi-function apparatus 100 can upload the electronic file of a desired image for a desired service.

The service providing apparatus 300 that receives the upload message transmits a response message indicating an upload result to the multi-function apparatus 100 (U318). The response message is also different for each service. Thus, the multi-function apparatus 100 cannot decrypt the response message. Note that the upload result corresponds to information indicating whether or not the electronic file has been normally uploaded. In the case where the electronic file has normally been uploaded, the upload result includes information indicating an ID for the electronic file.

Since the multi-function apparatus 100 cannot decrypt the response message, the upload result cannot be displayed on the display unit 160 as it is. Thus, the multi-function apparatus 100 transmits a request for decryption (hereinafter also referred to as "decryption request") to the relay apparatus 200 (U319) for the relay apparatus 200 to decrypt the response message. In the message for the decryption request, the response message received by the multi-function apparatus 100 is stored as it is.

The relay apparatus 200 that receives the decryption request creates the result of decrypting the response message (U320). More specifically, the relay apparatus 200 extracts the upload result included in the response message and creates a message which includes the upload result and has a form decryptable by the multi-function apparatus 100, as the decryption result. The decryption result is created based on the program corresponding to the service designated by the user. More specifically, if the service designated by the user is service A, the relay apparatus 200 creates the decryption result based on the decrypting program for service A stored in the storage unit 230. If, on the other hand, the service designated by the user is service B, the relay apparatus 200 creates the decryption result based on the decrypting program for service B stored in the storage unit 230.

The relay apparatus 200 which creates the decryption result transmits the decryption result created for the multi-function apparatus 100 (U321).

After the electronic file has been uploaded, notifying processing is executed for the user authorized to access the album in which the electronic file has been uploaded and updated.

First, the multi-function apparatus 100 transmits the request for obtaining URL for the album (hereinafter also referred to as "album URL obtaining request") to the relay apparatus 200 (U411). The album URL obtaining request is for obtaining the list of album URLs included in the service selected by the user. In addition, a request is made for obtaining information on the security setting for the album.

The relay apparatus 200 which receives the album URL obtaining request transmits the album URL request to the service providing apparatus 300 for the service selected by the user (U412). The relay apparatus 200 makes a request for the list of albums included in the service selected based on the service identifying information and user identifying information included in the album URL obtaining request received from the multi-function apparatus 100. At that time, the relay apparatus 200 creates the album URL request in accordance with the program corresponding to the service designated by the user.

Here, the relay apparatus 200 is provided with a URL obtaining program for each service designated by the user, which makes the relay apparatus 200 create an album URL request corresponding to the service and transmit it to the service providing apparatus 300. This is similar to the case with the request for upload destination URL (U312) described above, and thus will not be described in detail.

The service providing apparatus 300 which receives the album URL request transmits a URL corresponding to the received album URL request to the relay apparatus 200 as the album URL (U413).

The relay apparatus 200 which receives the album URL transmits the received album URL to the multi-function apparatus 100. The relay apparatus 200 also transmits security setting for the album (U414).

Next, the multi-function apparatus 100 transmits an electronic file URL obtaining request for obtaining URL for the electronic file stored in the obtained album (U415). The electronic file URL obtaining request is for obtaining a list of the electronic file URLs included in the album selected by the user.

The relay apparatus 200 which receives the request for obtaining electronic file URL transmits the electronic file URL request to the service providing apparatus 300 for the service selected by the user (S416). The relay apparatus 200 makes a request for a list of electronic files for the images included in the album selected based on the album identifying information and user identifying information included in the electronic file URL obtaining request received from the multi-function apparatus 100. At that time, the relay apparatus 200 creates an electronic file URL request in accordance with the program corresponding to the service designated by the user.

Here, the relay apparatus 200 is provided with the URL obtaining program for each service designated by the user, which makes the relay apparatus 200 create the electronic file URL request corresponding to the service and transmit it to the service providing apparatus 300. This is similar to the case with the upload destination URL request (U312) described above and thus will not be described in detail.

The service providing apparatus 300 which receives the electronic file URL request transmits the URL corresponding to the received electronic file URL request to the relay apparatus 200 as the electronic file URL (U417).

The relay apparatus 200 which receives the electronic file URL transmits the received electronic file URL to the multi-function apparatus 100 (U418).

An e-mail or facsimile data is created including the album URL and electronic file URL received by the processing described above (U419), and the e-mail or facsimile data is sent to the user who is authorized to the album and electronic file by the security setting for the album (U420).

The above description with reference to the sequence diagram (FIG. 3) is a mere example and is not to limit the present invention. In a service which requires mapping of the uploaded electronic file to a predetermined album after the electronic file is uploaded as with flickr (registered trademark), for example, the relay apparatus 200 performs the following process for U320 above. The relay apparatus 200 which receives the decryption request decrypts the response message from the service providing apparatus 300 while sending an instruction for mapping the uploaded electronic file to a predetermined album to the service providing apparatus 300. Thereafter, the relay apparatus 200 may send, instead of the decryption result, the information indicating that the electronic file has been uploaded to the album, for which mapping is instructed to the service providing apparatus 300, to the multi-function apparatus 100.

<Operation of Multi-function Apparatus 100>

Next, referring to FIGS. 4 to 9, operation of the multi-function apparatus 100 will be described in detail. When the power of the multi-function apparatus 100 is turned on, the control unit 130 of the multi-function apparatus 100 starts a main process illustrated in FIG. 4 in accordance with a main processing program stored in the ROM 125.

First, the control unit 130 shows a menu item selection screen on the display 160 and accepts selection of a menu item by the user (S110). On the menu item selection screen, a plurality of menu items are displayed. The user can select a desired menu item by operating the operation unit 190. The plurality of menu items include, at least, "upload," "download" and "register in telephone directory."

The "upload" is a menu item selected in uploading a desired electronic file to the electronic file storing service. The "download" is a menu item for downloading a desired electronic file from the electronic file storing service. Furthermore, the "register in telephone directory" is a menu item for registering information on a registrant.

After the selection for a menu item made by the user is accepted, the control unit 130 determines whether the selected menu item is "upload" (S111).

If the selected menu item is "upload" (S111: YES), the control unit 130 performs a security setting process (S112)

and then an uploading process (S113). Furthermore, the control unit 130 determines whether or not an error flag is set (S114).

If the error flag is not set (S114: NO), the control unit 130 performs a notifying process (S115).

If the selected menu item is not "upload" (S111: NO), the control unit 130 determines whether the selected menu item is "download" or not (S116).

If the selected menu item is "download" (S116: YES), the control unit 130 performs a downloading process (S117). The downloading process is for downloading an electronic file from the service selected by the user.

If the selected menu item is not "download" (S116: NO), the control unit 130 determines whether the selected menu item is "register in telephone directory" or not (S118).

If the selected menu item is "register in telephone directory" (S118: YES), the control unit 130 performs a telephone directory registering process (S119). If the selected menu item is not "register in telephone directory" (S118: NO), the control unit 130 performs a process in accordance with the selection of another menu item (S120).

After any one of the steps S115, S117, S119 and S120 have been performed, or when the error flag is on (S114: YES), the control unit 130 determines whether or not the power is turned off by the user (S121). If the power has not been turned off by the user (S121: NO), the control unit 130 returns back to the step S110 above and repeats the processing from steps S110 to S121 described above. If the power has been turned off (S121: YES), the control unit 130 turns off the power-supply of the multi-function apparatus 100 and terminates the main process.

Figure 5:
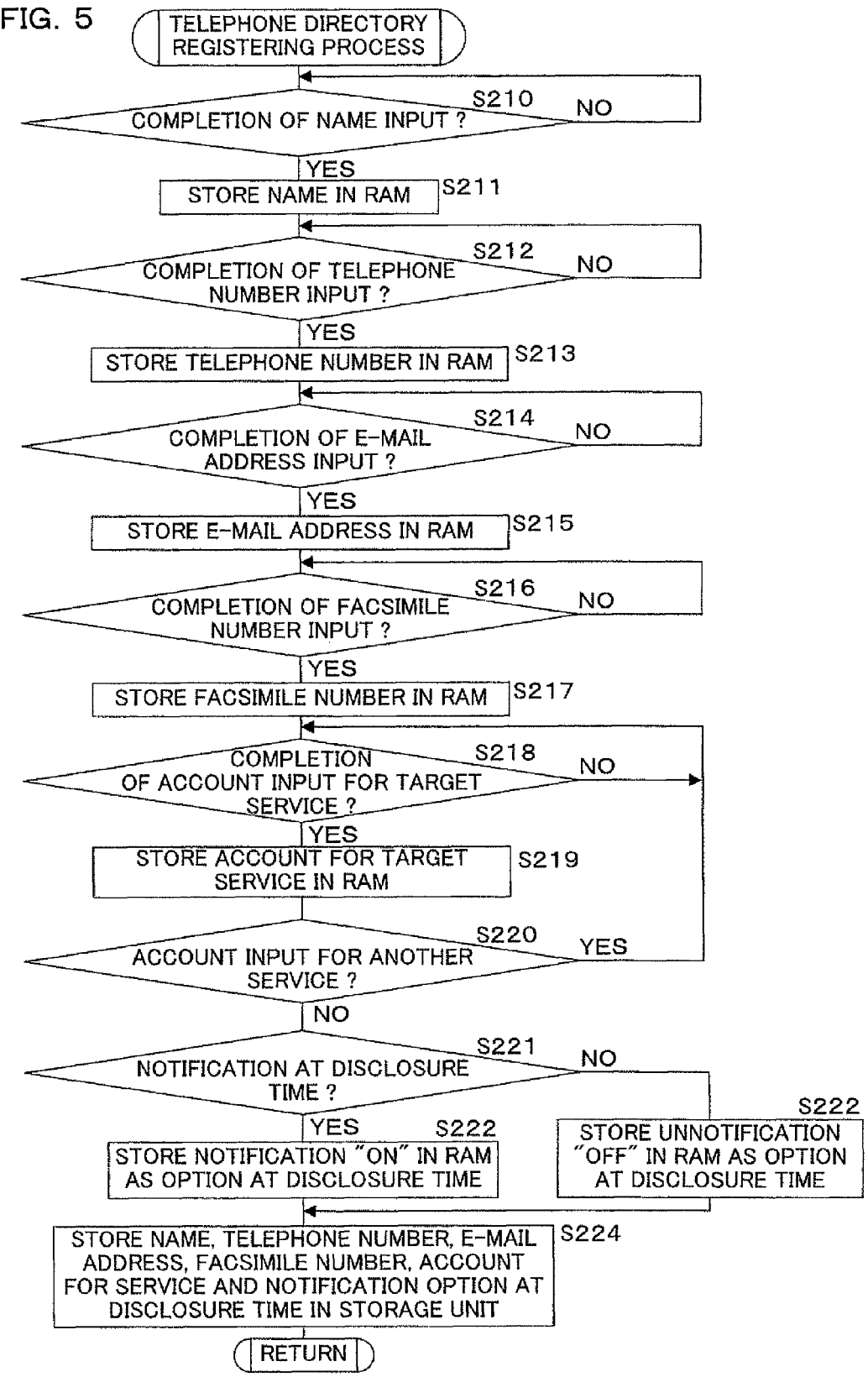
FIG. 5 is a flowchart illustrating an operation (telephone directory registering process) of the multi-function apparatus 100.

Next, referring to FIG. 5, the telephone directory registrating process (S119) described above will be explained in detail. When the telephone directory registrating process (S119) is started, the control unit 130 displays a screen for entering a name on the display unit 160 to accept a registrant's name inputted by the user.

The control unit 130 determines whether or not the input of the registrant's name has been completed (S210). If the input of the registrant's name has not been completed (S210: NO), the control unit 130 waits until such information is inputted. If the input of the registrant's name has been completed (S210: YES), the control unit 130 stores therein the registrant's name in the RAM (S211).

Next, the control unit 103 makes the display unit 160 display a screen for entering a telephone number to accept input of a registrant's telephone number. The control unit 130 determines whether or not the input of the registrant's telephone number has been completed (S212). If the input of the registrant's telephone number has not been completed (S212: NO), the control unit 130 waits until such information is input. If the input of the registrant's telephone number has been completed (S212: YES), the control unit 130 stores the registrant's telephone number in RAM (S213).

Subsequently, the control unit 130 makes the display unit 160 display a screen for entering an e-mail address to accept a registrant's e-mail address inputted by the user. The control unit 130 determines whether or not the input of the registrant's e-mail address has been completed (S214). If the input of the registrant's e-mail address has not been completed (S214: NO), the control unit 130 waits until such information is inputted. If the input of the registrant's e-mail address has been completed (S214: YES), the control unit 130 stores the registrant's e-mail address in the RAM (S215).

Next, the control unit 130 makes the display unit 160 display on a screen for entering a facsimile number to accept a registrant's facsimile number input by the user. The control unit 130 determines whether or not the input of the registrant's facsimile number has been completed (S216). If the input of the registrant's facsimile number has not been completed (S216: NO), the control unit 130 waits until such information is inputted. If the input of the registrant's facsimile number has been completed (S216: YES), the control unit 130 stores the registrant's facsimile number in the RAM (S217).

Next, the control unit 130 makes the display unit 160 display a screen for entering an account for the service to accept input of the account by the user if the registrant's account exists in the service. The control unit 130 determines whether or not the input of account has been completed (S218). If the input of account has not been completed (S218: NO), the control unit 130 is put in a wait state. If the input of account has been completed (S218: YES), the control unit 130 stores an account of the registrant for the target service in the RAM (S219). The input of account as described above is thus performed for each service (S220), and the processing moves on to security setting when all the accounts have been inputted (S220: NO).

The processing from the step S221 is for notifying the registrant who is authorized to view the service that the electronic file of an image has been uploaded to the service. First, if the registrant in the telephone directory is to be notified of the uploading when the security is set to disclose the album to which the electronic file is uploaded (S221: YES), the control unit 130 stores "ON," i.e. notify, in the RAM as an option for notification to the registrant at the time of disclosure (S222). If the registrant in the telephone directory is not to be notified even when the security is set to disclose the uploaded electronic file (S221: NO), the control unit 130 stores "OFF," i.e. unnotify, in the RAM as an option for notification to the registrant at the time of disclosure (S223).

After notify or unnofity at disclosure is set by the processing of the step S222 or S223, the control unit 130 stores the registrant's name, telephone number, e-mail address, facsimile number and account for service as well as the setting information on notify/unnofity option at disclosure in the storage unit 140 as a telephone directory (S224), and terminates the processing.

Figure 6:
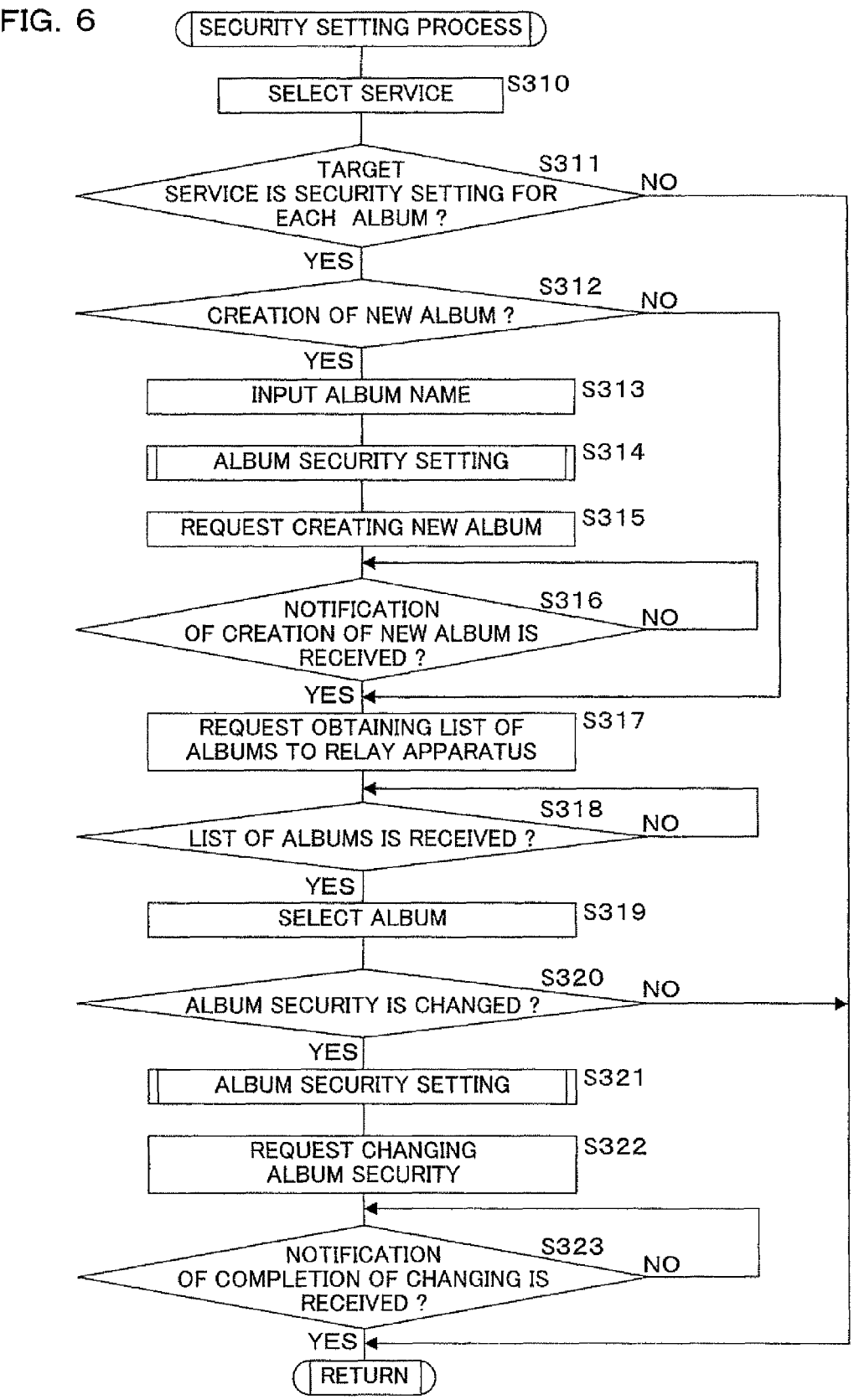
FIG. 6 is a flowchart illustrating an operation (security setting process) of the multi-function apparatus 100.
Figure 7:
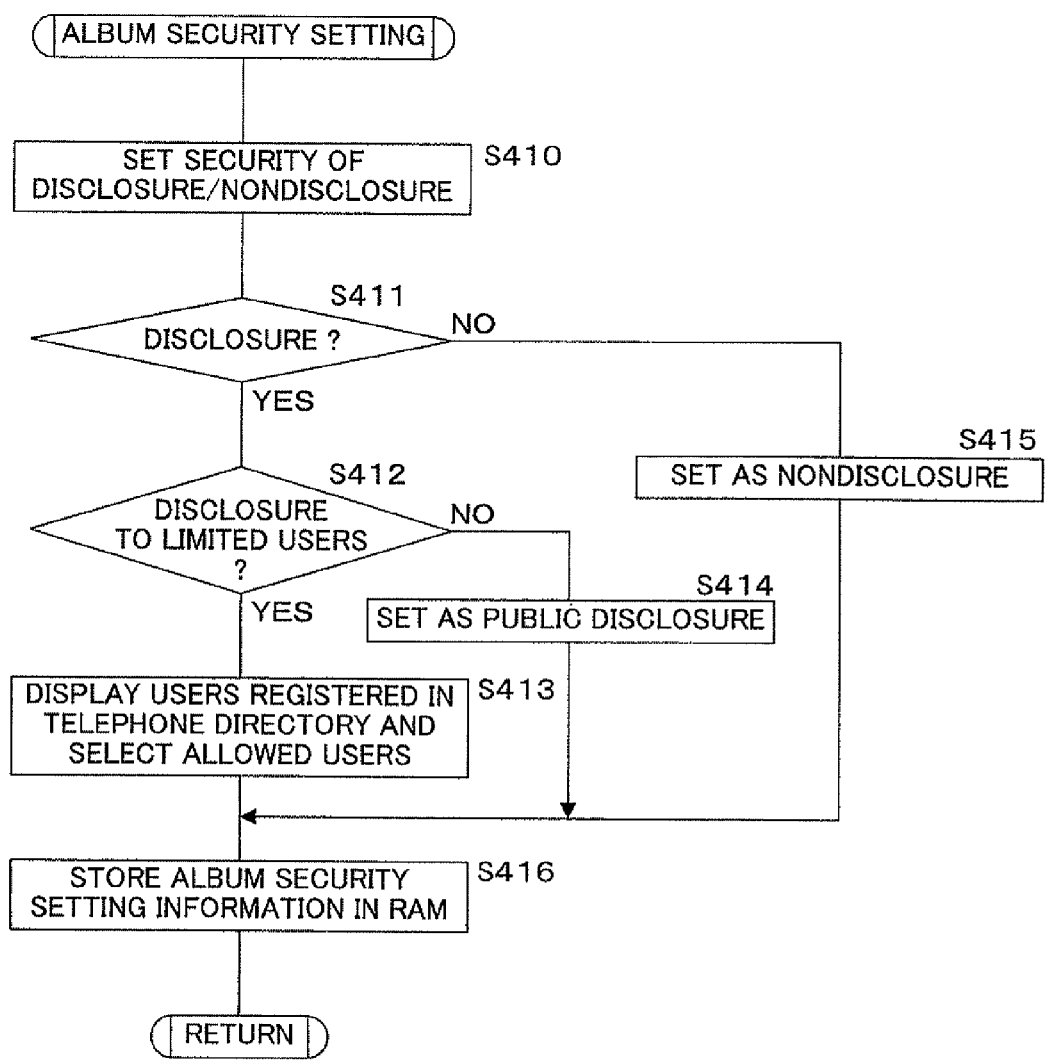
FIG. 7 is a flowchart illustrating a subroutine for performing security setting for an album in the operation (security setting process) of the multi-function apparatus 100.
Figure 11A:
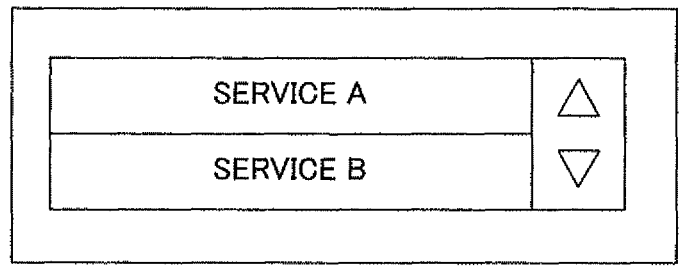
FIG. 11A shows an example of a service selecting screen displayed on a display unit 160.

Subsequently, referring to FIG. 6, the process of security setting will be described in detail. When the processing is started, the control unit 130 makes the display unit 160 display a screen for selecting a service (FIG. 11A) to accept selection of a service the user wishes to use (S310). In the present embodiment, the user can select a desired service between the service A and service B. If either one of the services is selected, the control unit 130 stores information for identifying the service selected by the user in the RAM. On the screen as shown in FIG. 11A, the user may scroll the screen display and click a desired service to make a selection.

Figure 11B:
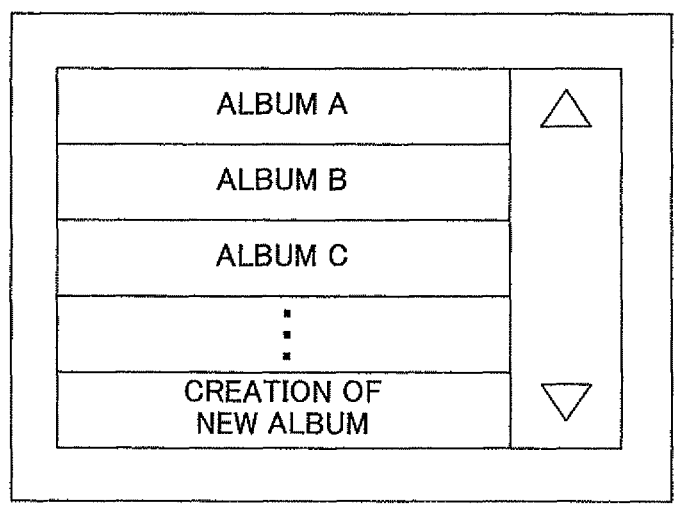
FIG. 11B shows an example of an album selecting screen displayed on the display unit 160.

Next, if the security setting is not performed on the selected service for each album (S311: NO), the processing is terminated. Here, the security can also be set for an electronic file. If the security setting is performed for each album (S311: YES), the control unit 130 makes the display unit 160 display a screen for selecting an album (FIG. 11B) to urge the user to select one of the existing albums or to select creation of a new album. On the screen illustrated in FIG. 11B, the user may scroll the screen display as needed and click a desired album to make a selection. If a new album is not to be created (S312: NO), the processing moves on to the step S317 described later. If a new album is to be created (S312: YES), the control unit 130 inputs an album name of the album to be newly created (S313).

Next, the control unit 130 performs a subroutine processing (FIG. 7) for the security setting for the album (S314).

In the subroutine processing for album security setting (FIG. 7), the control unit 130 makes the display unit 160 display a screen for selecting security (FIG. 11D) in which setting, i.e. disclosure or nondisclosure, of the selected album is made to accept selection for security setting by the user (S410). On the screen shown in FIG. 11D, a screen provided with a check box for each setting of nondisclosure, disclosure and limited disclosure is displayed. Setting is performed by the user selecting any one of the check boxes. Here, "disclosure" means that the album is open to public and thus can be viewed by all users. On the other hand, "limited disclosure" means that the album is disclosed only to specific registered users.

Figure 11C:
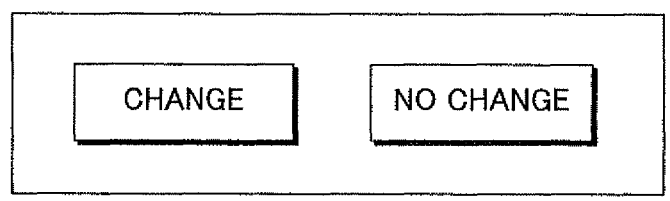
FIG. 11C shows an example of a security change selecting screen displayed on the display unit 160.
Figure 11D:
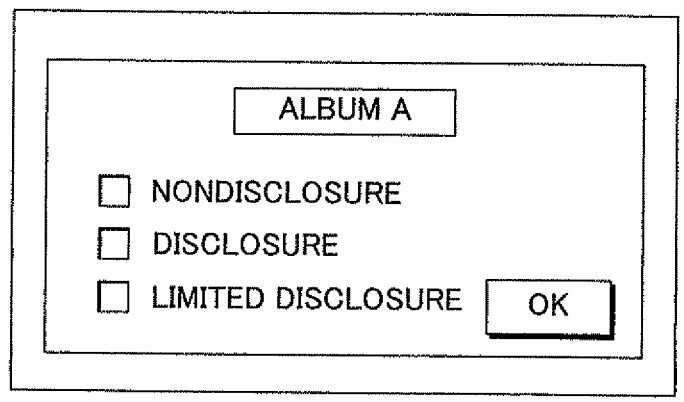
FIG. 11D shows an example of a security selecting screen displayed on the display unit 160.
Figure 11E:
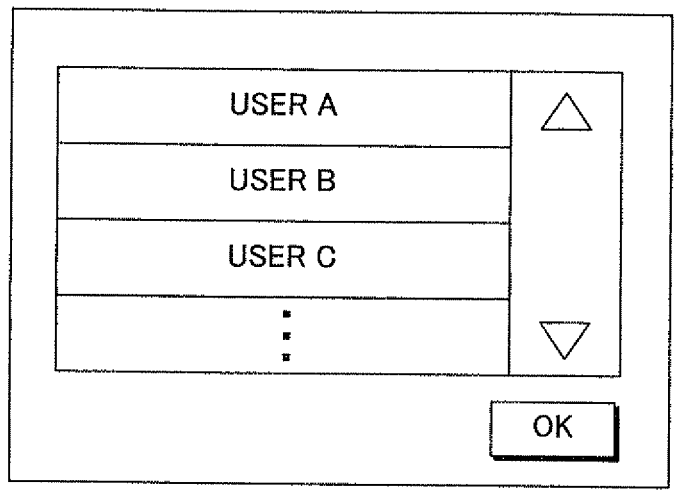
FIG. 11E shows an example of a user selecting screen displayed on the display unit 160.

If the album is not to be disclosed (S411: NO), the user selects the check box for nondisclosure on the security selecting screen (FIG. 11D) to make the security setting for the album set as "nondisclosure" (S415). If the album is to be disclosed (S411: YES), the user selects a check box for either "disclosure" or "limited disclosure" on the security selecting screen (FIG. 11D) (S412). If the user selects disclosure, not limited disclosure (S412: NO), he/she selects the check box for disclosure on the security selecting screen (FIG. 11D) to make the security setting for the album open to public (S414). If the user wishes the limited disclosure (S412: YES), he/she selects the check box for limited disclosure on the security selecting screen (FIG. 11D). Accordingly, the control unit 130 makes the display unit 160 display a user selecting screen (FIG. 11E) showing a list of users who have been registered in the telephone directory. The user scrolls the screen display as needed and clicks to select a user, to perform setting of a user/users to whom the contents of album is to be disclosed (S413).

After performing the steps S413, S414 or S415, the control unit 130 stores in the RAM the information on album security setting made by the user (S416), and terminates the processing.

When the input of an album name to be newly created (S313) and the security setting for album (S314) have been completed, the control unit 130 transmits a request for newly creating an album to the relay apparatus 200 (S315) (U111 in the sequence diagram (FIG. 3)). Next, it is determined whether or not a notification of completion, notifying the user that the creation of a new album is completed, has been received from the service providing apparatus 300 (S316). If the notification of completion for creation of a new album has not been received from the service providing apparatus (S316: NO), the control unit 130 waits until the notification of completion is received. If the notification of completion for creation of a new album has been received from the service providing apparatus 300 (S316: YES), the control unit 130 transmits a request for obtaining a list of albums to the relay apparatus 200 (S317), and determines whether or not the list of albums has been received from the service providing apparatus 300 (S318). If the list of albums has not been received from the service providing apparatus 300 (S318: NO), the control unit 130 waits until the list of albums is received. If the list of albums has been received from the service providing apparatus 300 (S318: YES), the control unit 130 makes the display unit 160 display the album selecting screen (FIG. 11B) to accept a selection of an album by the user (S319).

If the user selects an album on the album selecting screen (FIG. 11B), the control unit 130 makes the display unit 160 display a screen for changing security for the selected album. The control unit 130 determines whether or not the user instructed to change the security for the selected album (S320). The user selects "change" or "no change" on the screen shown in FIG. 11C. If the security for album is not to be changed (S320: NO), the security setting process is terminated. If the security for album is to be changed (S320: YES), the control unit 130 performs a subroutine process (FIG. 7) for album security setting as described earlier (S321).

The security setting changed by the subroutine process (FIG. 7) for album security setting is transmitted to the relay apparatus 200 by the control unit 130 in response to the request for changing album security (S322) (U111 in the sequence diagram (FIG. 3)). It is determined whether or not the notification of completion for album security changing has been received from the service providing apparatus 300 (S323). If the notification of completion has not been received (S323: NO), the control unit 130 waits until the notification of completion is received.

If the notification of completion has been received (S323: YES), the control unit 130 terminates the security setting process.

Next, the uploading process will be described in detail with reference to FIG. 8. When the uploading process is started, the control unit 130 makes the display unit 160 display a screen for selecting "scan" or "media" for the user to select how the electronic file is to be uploaded (S510). As selection items for the manner of uploading, the items of "scan" and "media" are displayed. The item "scan" is to read an image printed on a paper by the scanning unit 180 and upload the electronic file for the image to the service. The item "media" is, on the other hand, to select a desired electronic file among electronic files pre-stored in the memory card 151 and upload the selected electronic file to the service.

If the user selects "scan" (S511: YES), the control unit 130 makes the display unit 160 display an input screen for reading setting to accept input for reading setting by the user (S512). The "reading setting" corresponds to various kinds of settings to decide, for example, if the image printed on a paper is to be read with color or monochrome, how much resolution is to be used in reading and the like.

When the user places a paper, on which a predetermined image has been recorded, at the scanning unit 180 and presses a button on the operation unit 190 for start reading, the control unit 130 makes the scanning unit 180 read the image recorded on the paper and creates an electronic file from the read image data (S513) (U310 of the sequence diagram (FIG. 3)). Here, the scanning unit 180 performs reading in accordance with the setting used at the step S512.

If, on the other hand, the user selects "media" (S511: NO), the control unit 130 makes the display unit 160 display a screen for selecting a desired electronic file among the electronic files stored in the memory card 151, to accept selection of the electronic file by the user (S514).

After step S513 or step S514, the control unit 130 transmits a request for obtaining an upload destination URL to the relay apparatus 200 (S515) (U311 in the sequence diagram (FIG. 3)). The request for obtaining upload destination URL includes service identifying information, user identifying information and information on the album selected by the user at the step S319 in FIG. 6. For the service identifying information, the service identifying information stored in the RAM at step S310 is used. In the storage unit 140, the user identifying information for identifying the user of the multi-function apparatus 100 is stored in advance. For the user identifying information for the request for obtaining upload destination URL, the user identifying information stored in the storage unit 140 is used. In the case where more than one users share one multi-function apparatus 100, a log-in process for the user is performed in a well-known manner after the user selects the menu item of "upload," to identify the user identifying information of the user who is currently operating. Through the request for obtaining upload destination URL, the file to be uploaded is associated with the album selected at the step S319.

After the request for obtaining upload destination URL is transmitted, the control unit 130 determines whether or not the template for the upload message and upload destination URL have been received from the relay apparatus 200 that transmits the request for obtaining upload destination URL at the step S515 (S516).

If the template and upload destination URL have not been received from the relay apparatus 200 (S516: NO), the control unit 130 waits until such information is received.

If the template and upload destination URL have been received from the relay apparatus 200 (S516: YES), the control unit 130 creates an upload message based on the received template, the received upload destination URL, and the electronic file created at the step S513 or the electronic file selected at the step S514 (S517). The upload message is created as in the description for U316 in the sequence diagram (FIG. 3).

After the upload message is created, the control unit 130 transmits the upload message to the service providing apparatus 300 for the service selected by the user (S518) (U317 in the sequence diagram (FIG. 3)).

Next, it is determined whether or not the response message indicating the result of uploading has been received from the service providing apparatus 300 (S519).

If the result of uploading has not been received from the service providing apparatus 300 (S519: NO), the control unit 130 waits until the result of uploading is received.

If the result of uploading has been received from the service providing apparatus 300 (S519: YES), the control unit 130 transmits a request for decryption to the relay apparatus 200 (S520). The request for decryption includes the response message received from the service providing apparatus 300. Moreover, the request for decryption also includes the service identifying information for identifying the service selected by the user.

Next, the control unit 130 determines whether or not the result of decryption has been received from the relay apparatus 200 (S521). If the result of decryption has not been received from the relay apparatus 200 (S521: NO), the control unit 130 waits until the result of decryption is received.

If the result of decryption has been received from the relay apparatus 200 (S521: YES), the control unit 130 confirms the received result of decryption (S522). If the result of decryption is not normal completion (S523: NO), the control unit 130 determines whether or not the result of decryption has an allowable error with which the processing can continue, or an unallowable error with which the processing cannot continue (S524). The unallowable error corresponds to the case where abnormality has occurred in the service providing apparatus 300 or network 600 and thus communication with the service providing apparatus 300 can not be performed normally. The allowable error corresponds to the case where, for example, the communication with the service providing apparatus 300 is normally performed but the uploaded electronic file can not be normally transmitted for some reason.

If the result of decryption transmitted from the relay apparatus 200 corresponds to an unallowable error (S524: NO), the control unit 130 controls the display unit 160 based on the result of decryption and displays the fact that such an error has occurred (S526). An error flag is then set (S527) and the processing is terminated. If the result of decryption corresponds to an allowable error (S524: YES), the control unit 130 stores in the storage unit 140 the fact that such an error has occurred (S525). The processing is then moved on to the step S528.

If it is determined that the result of decryption is normal completion (S523: YES), or if the storage unit 140 stores the fact that the allowable error has occurred (S525), it is determined whether or not there is another image to be read by the scanning unit 180, or whether or not there is another electronic file to be uploaded in the memory card 151 (S528). Here, if there is an electronic file concerning the image to be read by the scanning unit 180 or if there is an electronic file to be uploaded in the memory card 151 (S528: YES), the processing moves on to the step S515. If there is no image to be read by the scanning unit 180 and there is no electronic file to be uploaded in the memory card 151 (S528: NO), the processing is terminated.

Next, the notifying process (S115) will be described in detail with reference to FIG. 9. When the notifying process (S115) is started, the control unit 130 transmits a request for obtaining the list of album URLs and security setting information to the relay apparatus 200 (S610) (U411 in the sequence diagram (FIG. 3)).

Subsequently, the control unit 130 determines whether or not the result of request has been received from the relay apparatus 200 (S611). If the result of request has not been received from the relay apparatus 200 (S611: NO), the control unit 130 waits until the result of request is received. If the result of request has been received from the relay apparatus 200 (S611: YES), the control unit 130 stores the list of album URLs and security setting information in the RAM (S612).

Next, the control unit 130 transmits the request for obtaining the list of electronic file URLs in the album uploaded in the uploading process (S113) to the relay apparatus 200 (S613) (U415 in the sequence diagram (FIG. 3)). Subsequently, the control unit 130 determines whether or not the result of request has been received from the relay apparatus 200 (S614). If the result of request has not been received from the relay apparatus 200 (S614: NO), the control unit 130 waits until the result of request is received. If the result of request has been received from the relay apparatus (S614: YES), the control unit 130 stores the list of electronic file URLs in the album uploaded to the RAM (S615).

Next, the control unit 130 determines whether or not the security setting for the album to which the electronic file is uploaded corresponds to the limited disclosure (S616). If it does not correspond to the limited disclosure (S616: NO), the processing is terminated. If it corresponds to the limited disclosure (S616: YES), the control unit 130 determines whether or not it is necessary to notify the user who is authorized to the limited disclosure (S617). If the notification is not required (S617: NO), the processing is terminated.

If the notification is required (S617: YES), the control unit 130 determines whether or not the user who is authorized to the limited disclosure is notified by an e-mail (S618). If the notification by e-mail is selected (S618: YES), the control unit 130 creates an electronic mail with an album URL and an electronic file URL (S619), and transmits it to the user who is authorized to the limited disclosure (S620). If the notification by e-mail is not selected (S618: NO), the control unit 130 creates a text for facsimile transmission with the album URL and electronic file URL attached (S621), and transmits it by facsimile to the user who is authorized to the limited disclosure (S622).

After step S620 or S622 is performed, the processing is terminated.

<Operation of Relay Apparatus 200>

Figure 10A:
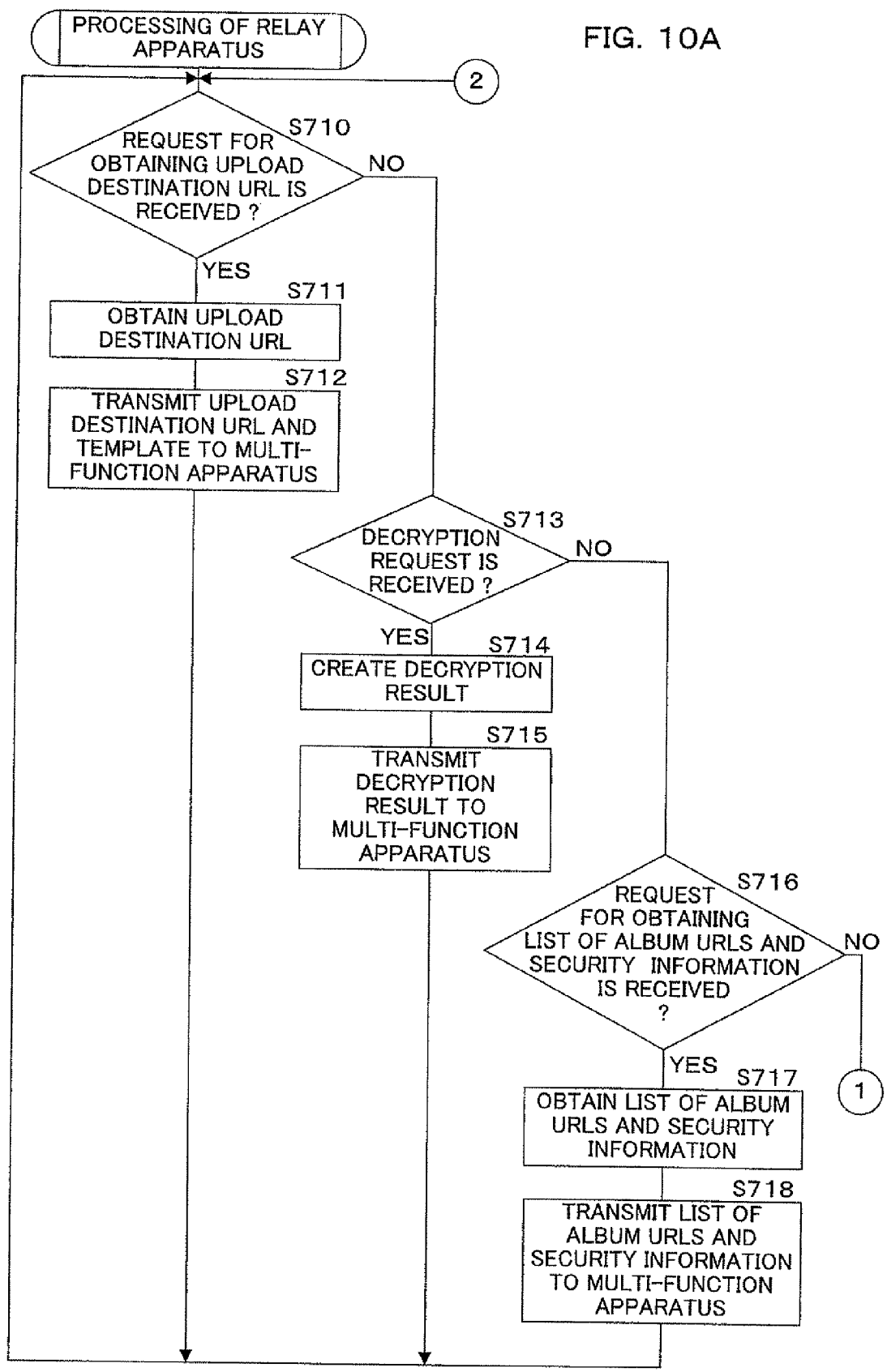
FIGS. 10A and 10B are a flowchart illustrating a processing of a relay apparatus 200.
Figure 10B:
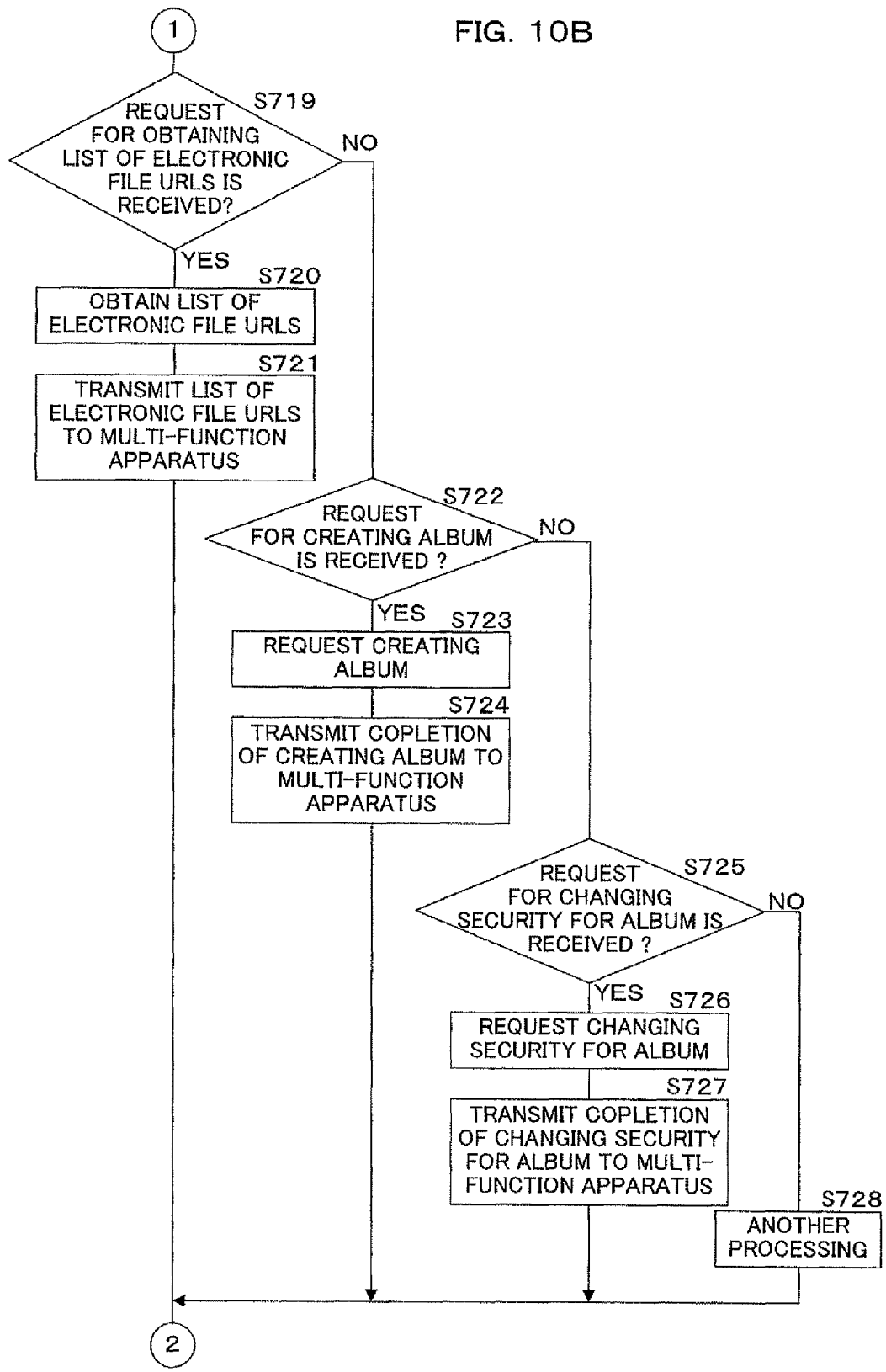

Referring now to FIGS. 10A and 10B, the operation of the relay apparatus 200 will be described below in detail. When the relay program stored in the storage unit 230 is started, the control unit 220 in the relay apparatus 200 starts the processing at the relay apparatus 200 as illustrated in FIGS. 10A and 10B in accordance with various types of programs stored in the storage unit 230.

When the processing is started, the control unit 220 first determines whether or not the request for obtaining upload destination URL has been received from the multi-function apparatus 100 (S710).

If it is determined that the request for obtaining upload destination URL has been received (S710: YES), the control unit 220 obtains an upload destination URL from the service providing apparatus 300 (S711) (U312, U313 in the sequence diagram (FIG. 3)). More specifically, the control unit 220 executes a program corresponding to the service identifying information included in the received request for obtaining upload destination URL and transmits the request for upload destination URL to the service providing apparatus 300 (U312 in the sequence diagram (FIG. 3)) to obtain the upload destination URL (U313 in the sequence diagram (FIG. 3)). Subsequently, the control unit 220 transmits the upload destination URL received from the service providing apparatus 300 and the created template to the multi-function apparatus 100 (S712), and the processing returns back to the step S710.

If the request for obtaining upload destination URL has not been received (S710: NO), the control unit 220 determines whether or not the request for decryption has been received from the multi-function apparatus 100 (S713).

If it is determined that the request for decryption has been received from the multi-function apparatus 100 (S713: YES) (U319 in the sequence diagram (FIG. 3)), the control unit 220 creates the result of decryption based on the response message included in the request for decryption (S714). Here, the control unit 220 creates the result of decryption in accordance with the program corresponding to the service selected by the user. The control unit 220 can identify the service selected by the user based on the service identifying information included in the request for decryption.

After creating the result of decryption, the control unit 220 transmits the created result of decryption to the multi-function apparatus 100 (S715), and the processing returns back to the step S710.

If it is determined that the request for decryption has not been received (S713: NO), the control unit 220 determines whether or not the list of album URLs and the request for obtaining security information have been received from the multi-function apparatus 100 (S716).

If it is determined that the list of album URLs and the request for obtaining security information have been received (S716: YES), the control unit 220 obtains the list of album URLs and security information from the service providing apparatus 300 (S717)(U412, U413 in the sequence diagram (FIG. 3)).

Next, the control unit 220 transmits the list of album URLs and security information obtained from the service providing apparatus 300 to the multi-function apparatus 100 (S718), and the processing returns back to the step S710.

If it is determined that the list of album URLs and the request for obtaining the security information have not been received (S716: NO), the control unit 220 determines whether or not the request for obtaining the list of electronic file URLs has been received from the multi-function apparatus 100 (S719).

If it is determined that the request for obtaining the list of electronic file URLs has been received (S719: YES), the control unit 220 obtains information on the list of electronic file URLs from the service providing apparatus 300 (S720). Subsequently, the control unit 220 transmits the information on the list of electronic file URLs obtained from the service providing apparatus 300 to the multi-function apparatus 100 (S721), and the processing returns back to the step S710.

If it is determined that the request for obtaining the list of electronic file URLs has not been received (S719: NO), the control unit 220 determines whether or not the request for creating album has been received from the multi-function apparatus 100 (S722).

If it is determined that the request for creating album has been received (S722: YES), the control unit 220 transmits the request for newly creating album for the service in the service providing apparatus 300 (S723), transmits a notification of completion of album creation to the multi-function apparatus 100 (S724), and the processing returns back to the step S710.

If it is determined that the request for creating album has not been received (S722: NO), the control unit 220 determines whether or not the request for changing security for album has been received from the multi-function apparatus 100 (S725).

If it is determined that the request for changing security for album has been received (S725: YES), the control unit 220 transmits the request for changing security setting for the existing album for the service in the service providing apparatus 300 (S726), transmits a notification indicating that the change has been completed to the multi-function apparatus 100 (S727), and the processing returns back to the step S710.

If it is determined that the request for changing security for album has not been received (S725: NO), the control unit 220 performs another processing (S728), and the processing returns back to the step S710. An example of another processing includes relaying of communication between the multi-function apparatus 100 and the service providing apparatus 300 performed when a desired electronic file is downloaded from the service by the multi-function apparatus 100.

As described above, the multi-function apparatus 100 performs the telephone directory registering process (S119) to allow the service account information, user's e-mail address, facsimile number and the like to be registered in the storage unit 140 in which the telephone directory information is stored. By performing the security setting process (S112), requests can be made to the relay apparatus 200 for creating a new file or changing the disclosure condition of an existing file (S315, S322). The uploading process (S113) allows an electronic file to be uploaded to the service providing apparatus 300 (S518). When the album for the upload destination of the electronic file is disclosed only to specific users, i.e., when the album is set with the condition of limited disclosure (S412: YES), the notifying process is performed (S115) to notify the user who is authorized to the limited disclosure that the electronic file is uploaded based on the information on the user to be notified. Moreover, the album URL and electronic file URL can be notified to the user who is authorized to disclosure of the album in accordance with the disclosure condition of the uploaded album among the users registered in the storage unit 140 (S620, S622). Accordingly, new creation of album storing an electronic file, setting of disclosure condition and changing of disclosure condition for an existing album can be performed for the electronic file storing service without a terminal apparatus such as a personal computer having a fulfilling web browser function.

In the case where a change in the disclosure condition is required to a new album, the security setting process is performed so that the name of the new album can be inputted when an album name is to be inputted for the target album (S313). If an existing album is to be required a change for its disclosure condition, a request for the list of albums is made to the relay apparatus 200 (S317) and thus a target album can be selected from the obtained albums (S319). If the limited disclosure, in which the disclosure is allowed to only a part of the users, is selected in selecting album security (S412: YES), the subroutine process for album security selection is performed (S314, S321) to select a disclosure condition for album. Moreover, if the selection is made as the limited disclosure in which the disclosure is allowed to limited users, a user who is authorized to view the album can be selected among the users having accounts in the target service registered in the storage unit 140 (S413). A request of setting can be made to the service for the album name of the target album inputted at step S313 or the target album selected at step S319, the disclosure condition of the target album selected at the steps S411 and S412, and the target user who is authorized to the disclosure and is selected by the selection of authorized user (S322). Furthermore, by the telephone directory registering process (S119), in the case where the limited disclosure is set for the security setting for the album when the electronic file is uploaded, selection can be made whether or not the user who is authorized to the limited disclosure is to be notified (S222).

The service providing apparatus 300 in the embodiment above is an example of the service providing apparatus according to the claims of the invention. The multi-function apparatus 100 in the embodiment above is an example of the communication apparatus according to the claims of the invention. The service cooperation system 10 in the embodiment above is an example of the communication apparatus system according to the claims of the invention. The storage unit 140 in the embodiment above is an example of the storage unit according to the claims of the invention. The control unit 130 performing the step S112 in the embodiment described above is an example of the security setting unit according to the claims of the invention. The control unit 130 performing the step S113 is an example of the upload processing unit according to the claims of the invention. The control unit 130 performing the step S115 in the embodiment above is an example of the notification processing unit according to the claims of the invention. The control unit 130 performing the step S313 in the embodiment above is an example of the new album name input unit according to the claims of the invention. The control unit 130 performing the step S319 in the embodiment above is an example of the album selecting unit according to the claims of the invention. The control unit 130 performing the steps S410, S411 and S412 is an example of the album security selecting unit according to the claims of the present invention. The control unit 130 performing the step S413 in the embodiment above is an example of the authorized user selecting unit according to the claims of the invention. The control unit 130 performing steps S315 and S322 in the embodiment above is an example of the album creation change requesting unit according to the claims of the invention. The control unit 130 performing the step S317 in the embodiment above is an example of the album list requesting unit according to the claims of the invention. The control unit 130 performing the step S610 in the embodiment above is an example of the album information requesting unit according to the claims of the invention. The control unit 130 performing the step S613 in the embodiment above is an example of the electronic file URL list requesting unit according to the claims of the invention. The control unit 130 performing the step S617 in the embodiment above is an example of the notification determining unit according to the claims of the invention. The control unit 130 performing the steps S618, S619 and S620 in the embodiment above is an example of the notifying unit according to the claims of the invention. The URL obtaining programs for service A and for service B in the embodiment above are examples for the upload destination program. The storage unit 230 in the embodiment above is an example of the upload destination program storage unit. U112 in the above embodiment is an example of the security setting requesting unit.

The present invention is not limited to the embodiments described above, but can be modified in various manners within the scope of the outline of the present invention.

Though URL is used for explanation as the address of upload destination in the embodiment above, the present invention is not limited thereto.

Moreover, in the embodiment described above, though the multi-function apparatus 100 is described to transmit the decryption request to the relay apparatus 200 at the step S520 in the uploading process, the present invention is not limited thereto. For example, the processing between the steps S520 to S522 may be eliminated.

In addition, in the embodiment described above, the processing of the step S616 in the notifying process may be eliminated and thus the step S617 is performed subsequent to the step S615. In such a case, the album for which the electronic file is uploaded can be open not only to limited users but also to any users. Accordingly, at the step S617, it may also be set to determine whether or not a notification should be given to users authorized to limited disclosure or all registrants stored in the telephone directory in the storage unit 140.

Furthermore, though the embodiment above described that the service cooperation system 10 is provided with the multi-function apparatus 100 and relay apparatus 200, the present invention is not limited thereto. The relay apparatus 200 can be removed from the service cooperation system 10. Here, in the ROM 125 of the control unit 130 included in the multi-function apparatus 100, plural software modules are stored such as the URL obtaining program for service A, template creating program for service A, decrypting program for service A, URL obtaining program for service B, template creating program for service B and decrypting program for service B. Here, the request for newly creating album (S315), the request for obtaining the list of albums (S317), the request for changing security setting for albums (S322), the request for obtaining upload destination URL (S515), the request for obtaining list of album URLs and security setting information (S610), and the request for obtaining the list of electronic file URLs that are made to the relay apparatus 200 are directly transmitted to the service providing apparatus 300 from the multi-function apparatus 100. Here, the multi-function apparatus 100 creates various requests in accordance with the program corresponding to the service designated by the user.

Furthermore, the template for the upload message (U314 in the sequence diagram (FIG. 3)) and the decryption result (U320 of the sequence diagram (FIG. 3)) that are created by the relay apparatus 200 are created in accordance with the program corresponding to each service by the multi-function apparatus 100. Moreover, since the response message outputted to the service providing apparatus 300 is decrypted by the decrypting program for various services stored in the multi-function apparatus 100, transmission of the decryption request (S520) and reception of the decryption result (S521) are not performed. In addition, notification of new album creation (S316), reception of the list of albums (S318), notification of completion of change in security setting of album (S323), reception of template for upload message and upload destination URL (S516), reception of the list of album URLs and security setting information (S611) and reception of the list of electronic file URLs are performed directly from the service providing apparatus 300 to the multi-function apparatus 100.

In the communication apparatus, the security setting unit includes: a new album name input unit inputting an album name of a target album when the target album for which a request is made to change the disclosure condition is a new album; an album selecting unit selecting a target album when the target album for which a request is made to change the disclosure condition is an existing album; an album security selecting unit selecting a disclosure condition of the target album; an authorized user selecting unit selecting a target user to be authorized to a disclosure among users having account information in the storage unit, when the album security selecting unit selects a limited disclosure condition disclosing an album to a limited user; and an album creation change requesting unit requesting the electronic file storing service to set the album name of the target album inputted from the new album name input unit or the target album selected by the album selecting unit, the disclosure condition of the target album selected by the album security selecting unit, and the target user to be authorized to a disclosure selected by the authorized user selecting unit.

In the communication apparatus, the security setting unit further includes an album list requesting unit requesting the electronic file storing service to obtain a list of albums when the target album for which a request is made to change the disclosure condition is an existing album, and the album selecting unit selects the target album from the list of albums obtained by the album list requesting unit.

In the communication apparatus, the notification processing unit includes: an album information requesting unit transmitting a request for obtaining a list of download URLs of albums and a disclosure condition for each of the albums from the service providing apparatus; an electronic file URL list requesting unit transmitting a request for obtaining a list of download URLs of the electronic files stored in the albums to which the electronic files are uploaded; a notification determining unit determining, when the album to which the electronic file is uploaded is set as a limited disclosure disclosing the album to a limited user, whether or not a notification of the download URL is to be given in accordance with uploading of the electronic file; and a notifying unit giving a notification by a predetermined notifying method when the notification determining unit determines that the notification is to be given.

In the communication apparatus, determination by the notification determining unit of whether or not a notification is given is pre-stored in the storage unit.

The disclosure condition of the target album, which is either a newly created album or an existing album, can be selected. If the disclosure condition for the target album is a limited disclosure, the target user to be authorized to the disclosure can be selected. Moreover, when selecting a target album from existing albums, the list of albums may be obtained to select the target album.

A notification may be given after determination is made on whether or not the target user is notified of the download URL in accordance with the uploading of the electronic file.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An image processing apparatus configured to send an email or facsimile and to be connected with a service providing apparatus via a network, the service providing apparatus comprising an album and being configured to provide an electronic file storing service for storing an electronic file in the album, the album having a disclosure condition stored therein, the image processing apparatus comprising:
   a processor; and
   a storage device that stores a directory and computer readable instructions that, when executed by the processor, cause the image processing apparatus to implement processes, comprising:
   registering, in the directory in the storage device, disclosure information and contact information associated with a user of the electronic file storing service;
   wherein, when the album is newly created:
      transmitting a new album request to the service providing apparatus for creating a new album, the new album request comprising service identifying information, user identifying information, an album name, and a security setting comprising a disclosure condition for the album;
      transmitting an upload message to the service providing apparatus;
      transmitting an album Uniform Resource Locator (URL) obtaining request for obtaining an album URL;
      obtaining the album URL, corresponding to the transmitted album URL obtaining request, and obtaining the security setting of the album; and
      transmitting the album URL via email or facsimile to a user selected in the security setting comprising the disclosure condition for the album, based on user identifying information stored in the directory;
   wherein, when the security setting of an album is changed:
      transmitting an album list request album for obtaining a list of albums;
      transmitting a security change request for changing the security setting of an album in response to a security change being selected from the list of albums;
      transmitting an upload message to the selected album of the service providing apparatus;
      transmitting an album URL request for obtaining an album URL;
      obtaining the album URL, corresponding to the transmitted album URL obtaining request, and obtaining the security setting of the album; and
      transmitting the album URL via email or facsimile to a user selected in the security setting comprising the disclosure condition for the album, based on user identifying information stored in the directory;
   wherein the computer readable instructions cause the image processing apparatus to implement further processes, comprising:
   reading an image; and
   creating the electronic file from read image data.

2. The image processing apparatus according to claim 1, wherein the computer readable instructions cause the image processing apparatus to implement further processes, comprising:
   allowing a user to input a new album name for a target album when the target album for which a request is made to change the disclosure condition is a new album;

allowing a user to select a target album when the target album for which a request is made to change the disclosure condition is an existing album;
allowing a user to select a disclosure condition of the target album;
allowing a user to select a target user, to be authorized to access the target album, the target user being one of users having account information stored in the storage device, when a limited disclosure condition, in which the target album is disclosed to a limited user, is selected; and
transmitting a request to the electronic file storing service to set the new album name of the target album or an album name of the selected target album, the selected disclosure condition of the target album, and the selected target user to be authorized to access the target album.

3. The image processing apparatus according to claim 2, wherein the computer readable instructions cause the image processing apparatus to implement further processes, comprising:
requesting the electronic file storing service to transmit a list of albums to the image processing apparatus when the target album for which a request is made to change the disclosure condition is an existing album; and
selecting the target album from the transmitted list of albums.

4. The image processing apparatus according to claim 1, wherein the computer readable instructions cause the image processing apparatus to implement further processes, comprising:
transmitting a request for obtaining a list of download URLs of albums and a disclosure condition for each of the albums from the service providing apparatus;
transmitting a request for obtaining a list of download URLs of the electronic files stored in the albums;
determining, when the album to which the electronic file is uploaded is set as a limited disclosure for disclosing the album to a limited user, whether or not a notification of the download URL is to be outputted in response to uploading of the electronic file; and
outputting a notification by a predetermined notifying method when determined that the notification is to be outputted.

5. The image processing apparatus according to claim 4, wherein it is stored in the storage device whether the notification of the download URL is to be outputted when the album is set as the limited disclosure.

6. The image processing apparatus according to claim 1, wherein the computer readable instructions cause the image processing apparatus to implement further processes, comprising:
creating and transmitting facsimile data to a facsimile number of the authorized user when an e-mail address of the authorized user is not contained in the contact information registered in the storage device.

7. An image processing apparatus system, comprising:
a network connected with a service providing apparatus, the service providing apparatus being configured to provide an electronic file storing service for storing an electronic file; and
an image processing apparatus connected to the network and configured to send an email or facsimile,
wherein the image processing apparatus includes:
a processor; and
a storage device that stores a directory and computer readable instructions that, when executed by the processor, cause the image processing apparatus to implement processes, comprising:
registering, in the directory in the storage device, disclosure information and contact information associated with a user of the electronic file storing service;
wherein, when an album is newly created:
transmitting a new album request to the service providing apparatus for creating a new album, the new album request comprising service identifying information, user identifying information, an album name, and a security setting comprising a disclosure condition for the album;
transmitting an upload message to the service providing apparatus;
transmitting an album Uniform Resource Locator (URL) obtaining request for obtaining an album URL;
obtaining the album URL, corresponding to the transmitted album URL obtaining request, and obtaining the security setting of the album; and
transmitting the album URL via email or facsimile to a user selected in the security setting comprising the disclosure condition for the album, based on user identifying information stored in the directory;
wherein, when the security setting of an album is changed:
transmitting an album list request for obtaining a list of albums;
transmitting a security change request for changing the security setting of an album in response to a security change being selected from the list of albums;
transmitting an upload message to the selected album of the service providing apparatus;
transmitting an album URL request for obtaining an album URL;
obtaining the album URL, corresponding to the transmitted album URL obtaining request, and obtaining the security setting of the album; and
transmitting the album URL via email or facsimile to a user selected in the security setting comprising the disclosure condition for the album, based on user identifying information stored in the directory;
wherein the computer readable instructions cause the image processing apparatus to implement further processes, comprising:
reading an image; and
creating the file from the read image data.

8. An image processing apparatus system, comprising:
a relay apparatus connected, via a network, with a service providing apparatus, the service providing apparatus being configured to provide an electronic file storing service for storing an electronic file; and
an image processing apparatus connected to the network and configured to send an email or facsimile,
wherein the image processing apparatus includes:
a processor; and
a storage device that stores a directory and computer readable instructions that, when executed by the processor, cause the image processing apparatus to implement processes, comprising:
registering, in the directory in the storage device, disclosure information and contact information associated with a user of the electronic file storing service;

wherein, when an album is newly created:
transmitting a new album request to the service providing apparatus for creating a new album, the new album request comprising service identifying information, user identifying information, an album name, and a security setting comprising a disclosure condition for the album;
transmitting an upload message to the service providing apparatus;
transmitting an album Uniform Resource Locator (URL) obtaining request for obtaining an album URL;
obtaining the album URL, corresponding to the transmitted album URL obtaining request, and obtaining the security setting of the album; and
transmitting the album URL via email or facsimile to a user selected in the security setting comprising the disclosure condition for the album, based on user identifying information stored in the directory;
wherein, when the security setting of an album is changed:
transmitting an album list request for obtaining a list of albums;
transmitting a security change request for changing the security setting of an album in response to a security change being selected from the list of albums;
transmitting an upload message to the selected album of the service providing apparatus;
transmitting an album URL request for obtaining an album URL;
obtaining the album URL, corresponding to the transmitted album URL obtaining request, and obtaining the security setting of the album; and
transmitting the album URL via email or facsimile to a user selected in the security setting comprising the disclosure condition for the album, based on user identifying information stored in the directory;
wherein the computer readable instructions cause the image processing apparatus to implement further processes, comprising:
reading an image; and
creating the electronic file from the read image data,
wherein the relay apparatus includes:
a processor; and
a storage device that stores computer readable instructions that, when executed by the processor, cause the relay apparatus to implement processes, comprising:
storing an upload destination program for requesting the service providing apparatus to change the disclosure condition of the album using a disclosure Application Programming Interface (API) included in the electronic file storing service; and
requesting, when a request for changing the disclosure condition of the album is received from the image processing apparatus, the electronic file storing service to change the disclosure condition of the album by executing the upload destination program.

9. The image processing apparatus according to claim 1, wherein the computer readable instructions cause the image processing apparatus to implement further processes, comprising:
adding a user to the directory; and
setting a disclosure condition associated with the added user.

\* \* \* \* \*